US012769494B2

(12) United States Patent
Wan et al.

(10) Patent No.: US 12,769,494 B2
(45) Date of Patent: Oct. 20, 2026

(54) METHOD, APPARATUS, DEVICE, READABLE STORAGE MEDIUM AND PRODUCT OF DISPLAYING A SESSION INTERFACE

(71) Applicant: Beijing Zitiao Network Technology Co., Ltd., Beijing (CN)

(72) Inventors: Shiqi Wan, Beijing (CN); Siqi Shu, Beijing (CN)

(73) Assignee: Beijing Zitao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/625,896

(22) Filed: Apr. 3, 2024

(65) Prior Publication Data

US 2024/0272855 A1 Aug. 15, 2024

Related U.S. Application Data

(63) Continuation of application No. PCT/CN2023/119039, filed on Sep. 15, 2023.

(30) Foreign Application Priority Data

Sep. 21, 2022 (CN) ......................... 202211154224.9

(51) Int. Cl.
*G06F 3/0481* (2022.01)
*G06F 3/14* (2006.01)
*H04L 65/1096* (2022.01)

(52) U.S. Cl.
CPC .............. *G06F 3/14* (2013.01); *G06F 3/0481* (2013.01); *H04L 65/1096* (2013.01)

(58) Field of Classification Search
None
See application file for complete search history.

(56) References Cited

U.S. PATENT DOCUMENTS 6,781,608 B1 8/2004 Crawford
11,574,027 B1 * 2/2023 Friedland ............... G06N 20/00
(Continued)

FOREIGN PATENT DOCUMENTS

CN 105405092 A 3/2016
CN 107743086 A 2/2018
(Continued)

OTHER PUBLICATIONS

Anonymous., "Take a photo: If you want to socialize with strangers around you, change your photo first", Technode, Feb. 28, 2015, pp. 1-4.
(Continued)

*Primary Examiner* — Henry Orr

(57) ABSTRACT

Embodiments of the disclosure provide a method, apparatus, electronic device, computer-readable storage medium, computer program product and computer program of displaying a session interface. The method includes: receiving a first media content transmitted by a second user having a predetermined association with a first user; displaying, within a session interface, at least one predetermined image comprised in the first media content in a first display state; and in accordance with a satisfaction of a predetermined first switching condition, switching the display state of the first media content to a predetermined second display state.

20 Claims, 10 Drawing Sheets

(56) References Cited

U.S. PATENT DOCUMENTS

| | | | | |
|---|---|---|---|---|
| 2006/0259923 | A1 | 11/2006 | Chiu | |
| 2013/0283061 | A1 | 10/2013 | Jeong | |
| 2015/0067878 | A1* | 3/2015 | Steelberg | H04W 4/21 726/26 |
| 2015/0172238 | A1 | 6/2015 | Ahmed et al. | |
| 2015/0229882 | A1 | 8/2015 | Liu | |
| 2015/0288742 | A1 | 10/2015 | Flynn et al. | |
| 2015/0319141 | A1 | 11/2015 | Jang et al. | |
| 2015/0371014 | A1* | 12/2015 | Raley | G09G 5/395 726/26 |
| 2016/0173429 | A1 | 6/2016 | Krug et al. | |
| 2016/0248864 | A1* | 8/2016 | Loia | G06Q 50/01 |
| 2018/0152759 | A1* | 5/2018 | Miller | G06F 16/2455 |
| 2019/0050600 | A1* | 2/2019 | Sahoo | G06F 21/6281 |
| 2020/0387995 | A1* | 12/2020 | Bucciarelli | H04W 4/14 |
| 2020/0403956 | A1* | 12/2020 | Adamski | H04L 51/216 |
| 2021/0385184 | A1* | 12/2021 | Dalonzo | G06F 3/04886 |
| 2023/0376179 | A1* | 11/2023 | Heikkinen | G06F 1/1686 |

FOREIGN PATENT DOCUMENTS

| | | | |
|---|---|---|---|
| CN | 109728996 | A | 5/2019 |
| CN | 110073642 | A | 7/2019 |
| CN | 110162371 | A | 8/2019 |
| CN | 110377763 | A | 10/2019 |
| CN | 113568616 | A | 10/2021 |
| CN | 115079884 | A | 9/2022 |
| CN | 115576456 | A | 1/2023 |
| CN | 115878242 | A | 3/2023 |
| KR | 2015-0033036 | A | 4/2015 |
| WO | 2006077734 | A1 | 7/2006 |

OTHER PUBLICATIONS

Office action received from Chinese patent application No. 202211154224.9 mailed on Dec. 26, 2023, 29 pages (16 pages English Translation and 13 pages Original Copy).

Office action received from Japanese patent application No. 202211154224.9 mailed on Nov. 22, 2023, 37 pages (22 pages English Translation and 15 pages Original Copy).

First Office Action issued in CN Appl. No. 2024-575807 on Jan. 13, 2026, English translation (28 pages).

European Search report for EP Appl. No. 23867408.9 issued Aug. 3, 2026, 10 pages.

* cited by examiner

METHOD, APPARATUS, DEVICE, READABLE STORAGE MEDIUM AND PRODUCT OF DISPLAYING A SESSION INTERFACE

CROSS REFERENCE

This application is a continuation of International Patent Application No. PCT/CN2023/119039, filed on Sep. 15, 2023, which claims the benefit of CN Patent Application No. 202211154224.9 filed on Sep. 21, 2022 and entitled "METHOD, APPARATUS, DEVICE, READABLE STORAGE MEDIUM AND PRODUCT OF DISPLAYING A SESSION INTERFACE", both of which are incorporated herein by reference in their entireties.

FIELD

The present disclosure generally relates to the field of interface interaction, and especially to a method, apparatus, electronic device, computer-readable storage medium, computer program product and computer program of displaying a session interface.

BACKGROUND

With the improvement of hardware performance of terminal devices and the continuous progress of artificial intelligence technology, various application software provides an instant messaging function.

SUMMARY

Embodiments of the present disclosure provide a method, apparatus, electronic device, computer-readable storage medium, computer program product and computer program of displaying a session interface.

In a first aspect, embodiments of the present disclosure provide a method of displaying a session interface, applied to a client of a first user, comprising:

- receiving a first media content transmitted by a second user having a predetermined association with a first user;
- displaying, within the session interface, at least one predetermined image comprised in the first media content in a first display state; and
- in accordance with a satisfaction of a predetermined first switching condition, switching the display state of the first media content to a predetermined second display state.

In a second aspect, embodiments of the present disclosure provide a method of displaying a session interface, applied to a client of a second user, comprising:

- in response to a media content obtaining operation triggered by a second user within a predetermined media content obtaining interface, obtaining first media content;
- determining an association between the first media content and a first switching condition, and transmitting the first media content to a first user having a predetermined association with the second user, to enable a display state of the first media content in a session interface of the first user to be adjusted based on a predetermined first switching condition; and
- displaying, within the session interface, at least one predetermined image comprised in the first media content in a predetermined first display state or in a predetermined second display state.

In a third aspect, embodiments of the present disclosure provide an apparatus for displaying a session interface, applied to a client of a first user, comprising:

- a receiving module configured to receive a first media content transmitted by a second user having a predetermined association with a first user;
- a first display module configured to display within a session interface at least one predetermined image comprised in the first media content in a first display state; and
- a switching module configured to, in accordance with a satisfaction of a predetermined first switching condition, switch the display state of the first media content to a predetermined second display state.

In a fourth aspect, embodiments of the present disclosure provide an apparatus for displaying a session interface, applied to a client of a second user, comprising:

- an obtaining module configured to, in response to a media content obtaining operation triggered by a second user within a predetermined media content obtaining interface, obtain first media content;
- a transmitting module configured to determine an association between the first media content and a first switching condition, and transmit the first media content to a first user having a predetermined association with the second user, to enable a display state of the first media content in a session interface of the first user to be adjusted based on a predetermined first switching condition; and
- a second display module configured to display, within the session interface, at least one predetermined image comprised in the first media content.

In a fifth aspect, embodiments of the present disclosure provide an electronic device comprising: a processor and memory;

- the memory storing computer-executable instructions; and
- the processor executes the computer-executable instructions stored in the memory, to cause the processor to perform the method of displaying a session interface according to the first aspect and various possible designs of the first aspect or the second aspect and various possible designs of the second aspect.

In a sixth aspect, embodiments of the present disclosure provide a computer-readable storage medium, the computer-readable storage medium storing computer-executable instructions therein, and the computer-executable instructions, when executed by a processor, implementing the method of displaying a session interface according to the first aspect and various possible designs of the first aspect or the second aspect and various possible designs of the second aspect.

In a seventh aspect, embodiments of the present disclosure provide a computer program product comprising a computer program, wherein the computer program, when executed by a processor, implements the method of displaying a session interface according to the first aspect and various possible designs of the first aspect or the second aspect and various possible designs of the second aspect.

In an eighth aspect, embodiments of the present disclosure provide a computer program, and the computer program, when executed by a processor, implements the method of displaying a session interface according to the first aspect and various possible designs of the first aspect or the second aspect and various possible designs of the second aspect.

A method, apparatus, electronic device, computer-readable storage medium, computer program product and computer program of displaying a session interface provided by the present embodiment, by after receiving a first media content transmitted by a second user, displaying, within the session interface, at least one predetermined image comprised in the first media content in a first display state, and switching the display state of the first media content in accordance with a satisfaction of a predetermined first switching condition.

BRIEF DESCRIPTION OF THE DRAWINGS

In order to illustrate embodiments of the present disclosure or related art technical solutions more clearly, a brief description of the accompanying drawings to be used in the description of the embodiments or related techniques will be provided. Obviously, the accompanying drawings in the following description are some embodiments of the present disclosure, and other accompanying drawings may be obtained in accordance with these drawings without creative labors for those of ordinary skill in the art.

DETAILED DESCRIPTION

In order to make the purpose, technical solutions, and advantages of the embodiments of the present disclosure clearer, the technical solutions in the embodiments of the present disclosure will be described clearly and completely in conjunction with the accompanying drawings. Obviously, the described embodiments are part of the embodiments of the present disclosure, not all of them. Based on the embodiments in the present disclosure, all other embodiments obtained by those of ordinary skill in the art without creative efforts belong to the scope of protection of the present disclosure.

In order to solve the technical problem that existing instant messaging methods have relatively single interaction content, the present disclosure provides a method, apparatus, electronic device, computer-readable storage medium, computer program product and computer program of displaying a session interface.

It should be noted that the method, apparatus, electronic device, computer-readable storage medium, computer program product and computer program of displaying a session interface provided by the present disclosure may be applied to any application scene of instant messaging.

In existing instant messaging functions, users generally perform information interaction through text, image, audio, and so on. After one party transmits a message, the other party can view and reply to the message. However, the interface interaction and display mode of the existing instant messaging function are often relatively single, for example, the existing instant messaging function generally only support the transmitting and receiving of text, images, speech, and other content. Thereby the interaction mode and message display mode of the interface are often relatively single.

In order to improve the interaction and display effect in the instant messaging function, in the case of obtaining a first media content transmitted by the second user, the at least one predetermined image comprised in the first media content can be displayed in a first display state, and the display state of the first media content can be switched based on a predetermined first switching condition. Thereby, within the session interface, the first media content can display different display states based on different scenes, enriching the interaction mode and display state of the first media content.

Figure 1:
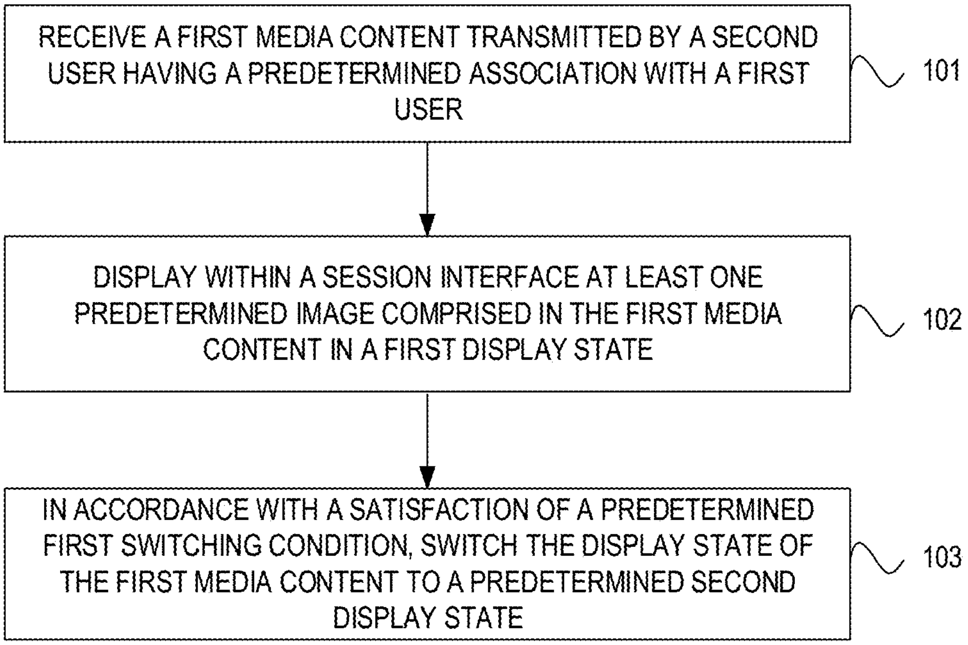
FIG. 1 is a schematic flowchart of a method of displaying a session interface provided by an embodiment of the present disclosure.

FIG. 1 is a schematic flowchart of a method of displaying a session interface provided by an embodiment of the present disclosure, applied to a client of the first user. As shown in FIG. 1, the method comprises:

Step 101. Receive a first media content transmitted by a second user having a predetermined association with a first user.

The executive object of the present embodiment is a terminal device of the first user, and the terminal device may be provided with a client of the first user. The terminal device can communicate and connect with a terminal device of the second user, so that the first media content transmitted by the terminal device of the second user can be obtained, and the display state of the first media content can be adjusted based on the predetermined first switching condition.

In the present embodiment, during the session between the first user and the second user, the second user may transmit the first media content to the first user, wherein the second user may have a predetermined association with the first user. For example, the second user may be a friend who is mutually followed by the first user, or the second user may be a user with whom the first user has a one-sided following relationship, or the second user may be a user whose interactions with the first user satisfy a predetermined condition, etc.

The first media content comprises but is not limited to image media content, video media content, etc. The number of such first media content may be at least one.

Step 102. Display within a session interface at least one predetermined image comprised in the first media content in a first display state.

In the present embodiment, after receiving the first media content, the display apparatus of the session interface can display the first media content in the session interface. Herein, the session interface can be a chat session interface between the first user and the second user.

In order to improve the interaction and display effect within the session interface, to cause the display content within the session interface to have more diversity, the first media content can be displayed in a predetermined first display state. Optionally, when the first media content is image content, the image content can be directly displayed in the predetermined first display state; when the first media content is a plurality of image contents, at least one image content can be displayed in the predetermined first display state; when the first media content is video media content, the predetermined video frames in the video media content can be displayed in the predetermined first display state.

Optionally, the first display state may be a blur display state. In the first display state, the first user can not view the clear first media content, and therefore can not obtain the entire information of the first media content. Herein, the blur display state comprises but is not limited to Gaussian blur and Mosaic blur, etc.

Step 103. In accordance with a satisfaction of a predetermined first switching condition, switch the display state of the first media content to a predetermined second display state.

In the present embodiment, the first switching condition may be predetermined. After obtaining the first media content, it is detected whether the first switching condition is currently satisfied. Optionally, it may be determined whether an operation triggered by the first user satisfies the first switching condition, and/or it may be determined whether the information such as a current system time satisfies the predetermined first switching condition.

In accordance with a satisfaction of the first switching condition, the display state of the first media content can be switched to the predetermined second display state. Herein, the second display state can be a clear display state. In the second display state, the first user can view the clear first media content.

Figure 2:
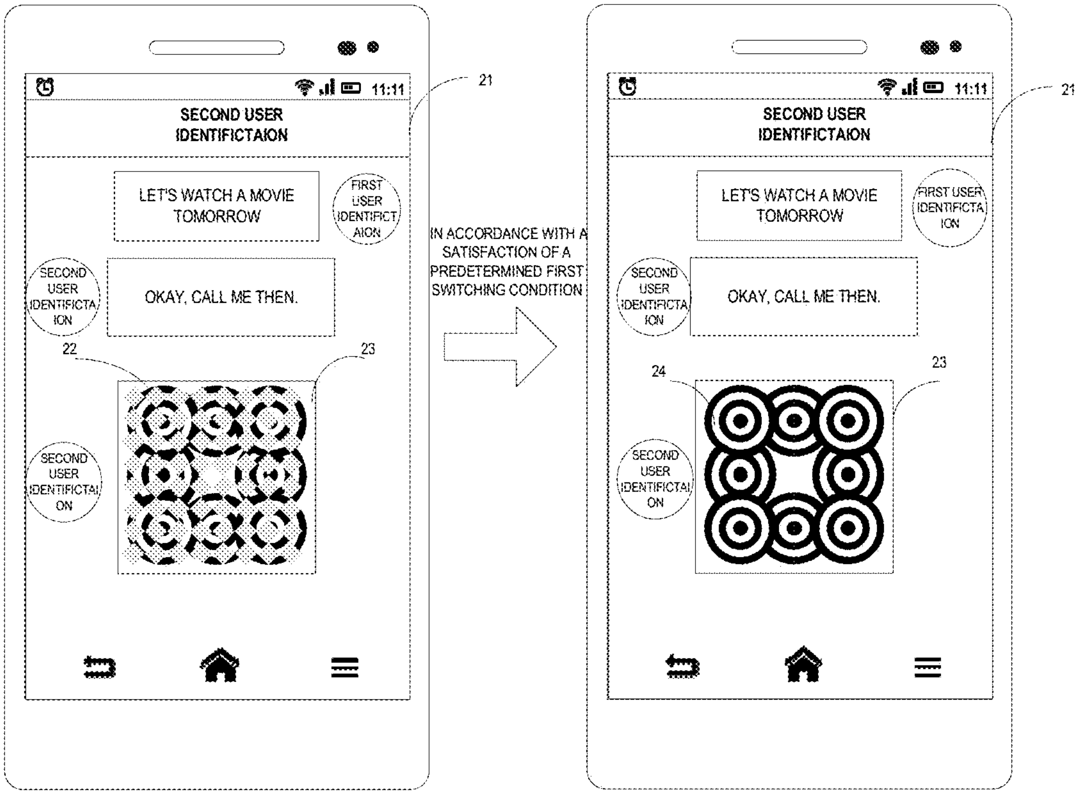
FIG. 2 is a schematic diagram of a display interface provided by an embodiment of the present disclosure.

FIG. 2 is a schematic diagram of a display interface provided by an embodiment of the present disclosure. As shown in FIG. 2, after obtaining the first media content, at least one predetermined image included in the first media content 23 can be displayed within the session interface 21 in the first display state. Herein, a media content cover 22 in the first display state can be a blur display state. In accordance with a satisfaction of the first switching condition, the display state of the first media content 23 can be switched to the predetermined second display state. Herein, the media content cover 24 of the second display state can be a clear display state.

The method of displaying a session interface provided by the present embodiment, after receiving the first media content transmitted by the second user, by displaying, within the session interface, at least one predetermined image comprised in the first media content in a first display state, and in accordance with a satisfaction of a predetermined first switching condition, switching the display state of the first media content. Thereby, the interaction content within the session interface can be enriched and the display of the session content can be improved.

Further, on the basis of any of the above embodiments, Step 102 comprises:

- performing blur processing on the at least one predetermined image comprised in the first media content to obtain the first media content in the first display state; and
- displaying, within the session interface, the first media content in the first display state.

In the present embodiment, the first display state may be a blur display state, and in the first display state, the first user can not view the first clear media content.

In order to implement the display of the first media content in the first display state, after obtaining the first media content, blur processing can be performed on at least one predetermined image included in the first media content to obtain the first media content in the first display state, and display the first media content in the first display state within the session interface.

Further, on the basis of any of the above embodiments, the performing blur processing on the at least one predetermined image comprised in the first media content to obtain the first media content in the first display state comprises:

- if the first media content is picture media content, performing blur processing on at least one picture comprised in the first media content to obtain the first media content in the first display state, wherein the first media content comprises at least one picture; and
- if the first media content is video media content, performing blur processing on a predetermined image frame of the first media content to obtain the first media content in the first display state.

In the present embodiment, the first media content comprises at least one picture, and the number of the first media content can be at least one. When the first media content is a picture media content, blur processing can be performed on at least one picture comprised in the first media content to obtain the first media content in the first display state. When the first media content is a plurality of picture media content, blur processing can be performed on at least one picture comprised in the at least one first media content to obtain the first media content in the first display state.

Optionally, the first media content may further be video media content, and the number of the first media content may be at least one. When the first media content is video media content, blur processing can be performed on predetermined image frames in respective video media content to obtain the first media content in the first display state.

Herein, the predetermined image frame may be a first video frame of the first media content or may be a video frame specified by the first user according to the actual needs, and the present disclosure imposes no limitation thereon.

Alternatively, on the basis of any of the above embodiments, the performing blur processing on the at least one predetermined image comprised in the first media content to obtain the first media content in the first display state comprises:

- performing Gaussian blur processing and/or Mosaic processing on the at least one predetermined image comprised in the first media content to obtain the first media content in the first display state.

In the present embodiment, the first display state comprises, but is not limited to, Gaussian blurring as well as Mosaic blurring and the like. Therefore, when performing the blurring processing on the first media content, Gaussian blur processing and/or Mosaic processing may be performed on the at least one predetermined image comprised in the first media content to obtain the first media content in the first display state.

The method of displaying a session interface provided by the present embodiment, by blurring the first media content after obtaining the first media content, the display of the first media content can be implemented in the first display state. Thereby, subsequent switching of the display state of the first media content can be implemented according to the predetermined first switching condition.

Figure 3:
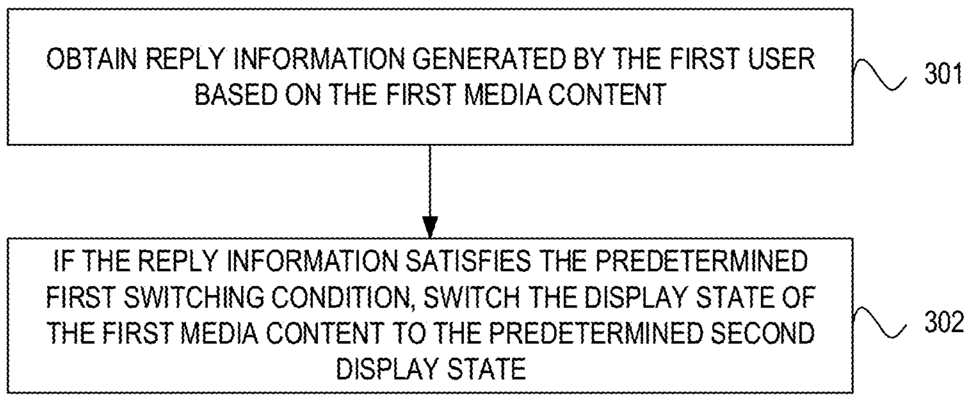
FIG. 3 is a schematic flowchart of a method of displaying a session interface provided by another embodiment of the present disclosure.

FIG. 3 is a schematic flowchart of a method of displaying a session interface provided by another embodiment of the present disclosure, based on any of the above embodiments, as shown in FIG. 3, Step 103 comprises:

Step 301. Obtain reply information generated by the first user based on the first media content.

Step 302. If the reply information satisfies the predetermined first switching condition, switch the display state of the first media content to the predetermined second display state.

In the present embodiment, after obtaining the first media content, the first user may generate a reply message based on the first media content. Herein, the reply message comprises, but is not limited to, a media content reply message, a text content reply message, and the like.

Optionally, the first media content can be associated with prompt information, and the first user can generate corresponding reply information based on the prompt information. For example, the prompt information can be: generate media content to view the first media content. Therefore, the first user can generate reply information comprising media content based on the prompt information to implement viewing of the first media content. Or, for example, the first media content can be associated with question information. The prompt information can be: answer questions to view the first media content. Therefore, the first user can reply to the question information based on the prompt information to implement viewing of the first media content.

Further, it is possible to obtain reply information generated by the first user based on the first media content and detect whether the reply information satisfies the predetermined first switching condition. Continuing from the above example, it is possible to detect whether the first user replies to the second media content to determine whether the first switching condition is satisfied. Continuing from the above example, it is possible to detect whether the reply information generated by the first user is correct to determine whether the first switching condition is satisfied.

When it is determined that the reply information satisfies the predetermined first switching condition, the display state of the first media content can be switched to the predetermined second display state. Therefore, the first media content can be switched from the blurred state to the clear state, and the first user can view the clear first media content.

Further, on the basis of any of the above embodiments. Step 301 comprises:

in response to a predetermined operation triggered by the first user on the first media content, jumping across to a predetermined reply interface; and obtaining the reply information based on media content obtained or reply content input by the first user within the reply interface.

In the present embodiment, after the first media content is displayed within the session interface, the first user can generate reply information by triggering the predetermined operation on the first media content. The predetermined operation comprises but is not limited to a long press operation, a click operation, a double-click operation, or a trigger operation on a control associated with the first media content.

Further, in response to the predetermined operation triggered by the first user on the first media content, it is possible to jump across to the predetermined reply interface. Different reply interfaces may correspond to different first switching conditions. For example, when the first switching condition is to reply to media content, the reply interface may be a media content collecting interface. When the first switching condition is to reply to text content, the reply interface may specifically be a text content collecting interface.

After jumping across to the reply interface, it is possible to obtain reply information based on the media content obtained or the reply content input by the first user within the reply interface.

The method of displaying a session interface provided by the present embodiment is able to implement the adjustment of the display state of the first media content precisely based on the first switching condition by predetermining the first switching condition. Thereby, the interaction within the session interface can be enriched.

Alternatively, on the basis of any of the above embodiments, the reply information comprises second media content generated by the first user based on the first media content, and Step 302 comprises:

in accordance with a determination that the second media content generated by the first user is obtained, switching the display state of the first media content to the predetermined second display state.

In the present embodiment, the first switching condition may be a switching of the display state of the first media content when the second media content replied by the first user is obtained.

Thus, it is possible to detect whether the second media content generated by the first user is obtained. When the second media content is acquired, i.e., the display state of the first media content can be switched to the predetermined second display state.

Figure 4:
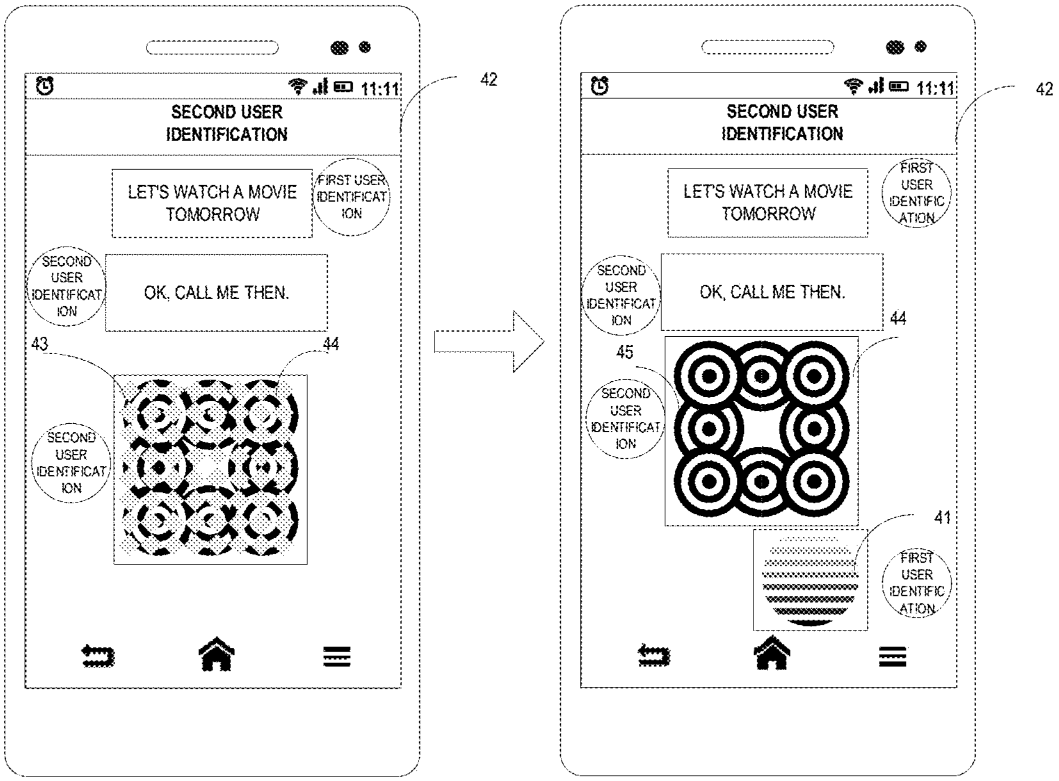
FIG. 4 is a schematic diagram of another display interface provided by an embodiment of the present disclosure.

FIG. 4 is a schematic diagram of another display interface provided by an embodiment of the present disclosure. As shown in FIG. 4, the reply information can be the second media content 41. When the second media content 41 is not obtained, the first media content 44 can be displayed in the first display state within the session interface 42, wherein the media content cover 43 in the first display state can be a blur display state. After obtaining the second media content 41, the display state of the first media content 44 can be switched to the second display state, wherein the media content cover 45 of the second display state can be a clear display state.

Thus, the first user can implement viewing the clear first media content transmitted by the second user by exchanging media content, thereby enriching the interaction pattern in the session interface and enabling the display content within the session interface to obtain different display effects based on different interactive operations.

Alternatively, on the basis of any of the above embodiments, the number of the first media content is at least one; and the in accordance with a determination that the second media content generated by the first user is obtained, switching the display state of the first media content to the predetermined second display state comprises:

in accordance with a determination that the second media content is obtained, switching the display state of respective first media content to the predetermined second display state.

In the present embodiment, the number of the first media content can be at least one. The session interface can be a private chat interface between the first user and the second user, or a chat interface for a group chat that the first user and the second user join at the same time. When the session interface is a group chat interface, a plurality of first users in the group chat can transmit the first media content to obtain at least one first media content. When the session interface is a private chat interface between the first user and the second user, the first user can transmit at least one first media content.

The predetermined first switching condition may be that when the first user obtains a plurality of first media contents transmitted by the second user, viewing of the plurality of first media contents is implemented by replying to one second media content.

Therefore, after the at least one first media content is obtained, it can be detected whether a second media content generated by the first user is obtained. When the second media content is obtained, i.e., the display state of respective first media content transmitted by the second user can be switched to the predetermined second display state.

For example, the second user can transmit three first media content to the first user, and the first user can view the three clear first media content by replying with one second media content.

Figure 5:
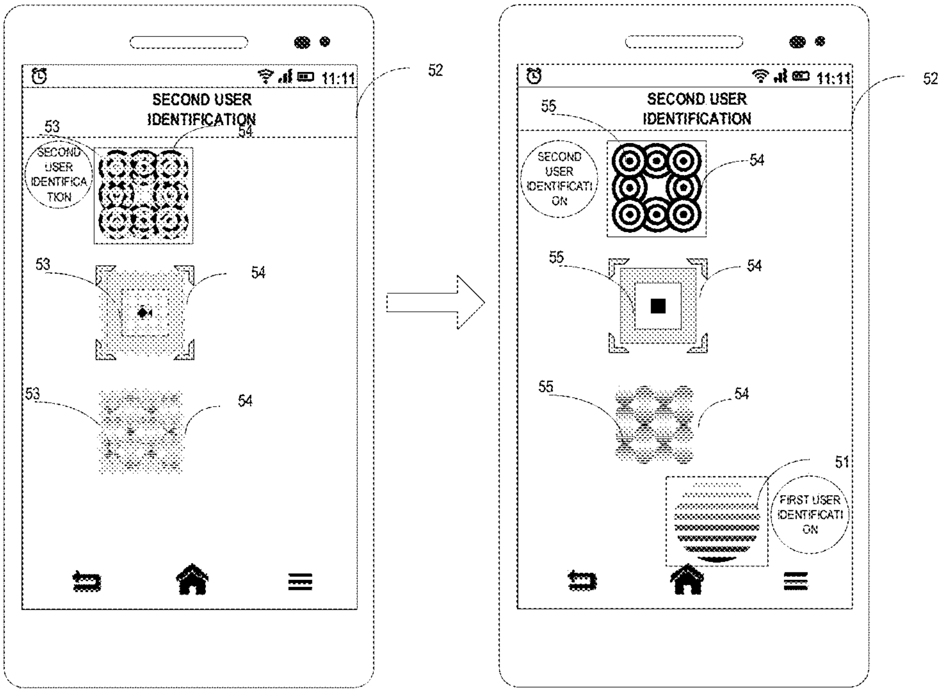
FIG. 5 is a schematic diagram of another display interface provided by an embodiment of the present disclosure.

FIG. 5 is a schematic diagram of another display interface provided by an embodiment of the present disclosure. As shown in FIG. 5, the number of first media contents is at least one. The reply information can be the second media content 51. When the second media content 51 is not obtained, at least one first media content 54 can be displayed in the first display state within the session interface 52, wherein the media content cover 53 in the first display state can be a blur display state. After obtaining the second media content 51, the display state of at least one first media content 54 can be switched to the second display state, wherein the media content cover 55 of the second display state can be a clear display state.

The present embodiment provides a method of displaying a session interface, by switching the display state of respective first media content transmitted by the second user to a predetermined second display state when the second media content is obtained, thereby enabling the first user to implement the viewing of a plurality of clear first media content by replying to a single second media content. The first user is able to obtain more media contents within the session interface, thereby enriching the interaction of the first media contents within the session interface.

Alternatively, on the basis of any of the above embodiments, the number of the first media content is at least one; and the in accordance with a determination that the second media content generated by the first user is obtained, switching the display state of the first media content to the predetermined second display state comprises:

in accordance with a detection that the number of the second media content is the same as the number of the first media content, switching the display state of respective first media content to the predetermined second display state.

In the present embodiment, the number of the first media content may be at least one. The predetermined first switching condition may be when the first user obtains a plurality of first media content transmitted by the second user, by replying to the first media content the same number of second media content to implement viewing of all the first media content transmitted by the second user.

Therefore, after obtaining at least one first media content, it is possible to detect whether the number of the second media content generated by the first user is the same as that of the first media content. If they are the same, the display state of respective first media content can be switched to a predetermined second display state. Conversely, respective first media content can be controlled to be displayed within the session interface in a first display state.

Figure 6:
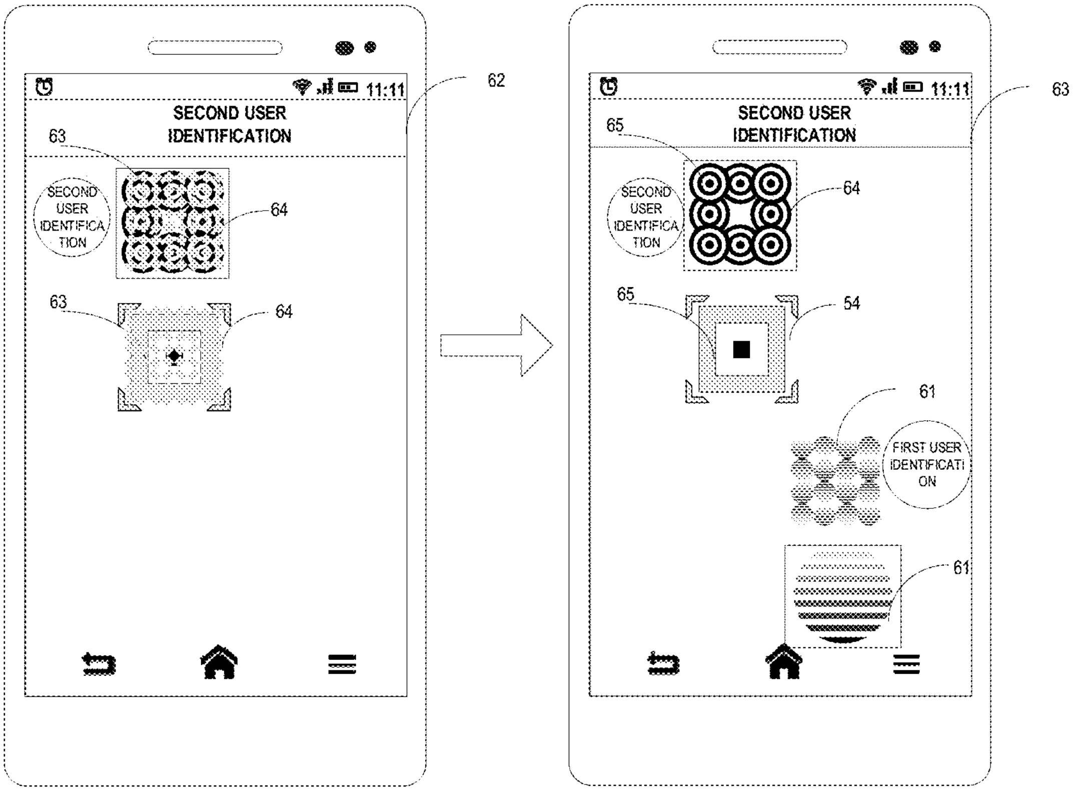
FIG. 6 is a schematic diagram of another display interface provided by an embodiment of the present disclosure.

FIG. 6 is a schematic diagram of another display interface provided by an embodiment of the present disclosure. As shown in FIG. 6, the number of first media contents is two. The reply information can be the second media content 61. When the second media content 61 is not obtained, two first media contents 64 can be displayed in the first display state within the session interface 62, wherein the media content cover 63 in the first display state can be a blur display state. When obtaining the second media content 61 or obtaining one second media content 61, the first media content 64 is controlled to maintain the first display state. After obtaining two second media contents 61, the display states of the two first media contents 64 can be switched to the second display state, wherein the media content cover 65 of the second display state can be a clear display state.

The method for displaying a session interface provided by the present embodiment implements viewing all of the first media content transmitted by the second user by replying to the second media content in the same number as the first media content, thereby enabling the first user and the second user to exchange a plurality of media content, enriching the interaction within the session interface, and causing the exchange of the media content to be more personalized to the needs of the user.

Alternatively, on the basis of any of the above embodiments, the number of the first media content is at least one; and the in accordance with a determination that the second media content generated by the first user is obtained, switching the display state of the first media content to the predetermined second display state comprises:

determining a first number of the generated second media content; and switching the display state of the first number of first media content to the predetermined second display state.

In the present embodiment, the number of the first media content may be at least one. The predetermined first switching condition may be that when the first user obtains a plurality of first media contents transmitted by the second user, a switching of the display state for the first media contents matched by the first number is implemented based on a first number of second media contents generated by the first user.

Alternatively a first number of second media content generated by the first user based on the first media content may be determined. The display state of the first number of first media content is switched to the predetermined second display state.

For example, if the first user transmits five first media contents, when the second user generates a second media content based on the first media content, the display state of one of the first media contents can be switched. When the second user generates two second media contents based on the first media content, the display state of two of the first media contents can be switched.

The method for displaying a session interface provided in the present embodiment switches the display state of the first number of first media content based on the first number of second media content generated by the first user based on the first media content, thereby enabling the exchange of media content to be more closely personalized to the needs of the user.

Alternatively, on the basis of any of the above embodiments, the in accordance with a determination that the second media content generated by the first user is obtained, switching the display state of the first media content to the predetermined second display state comprises:

switching, based on the obtained second media content, the display state of a partial region in the first media content to the predetermined second display state.

In the present embodiment, the number of the first media content may be at least one. The predetermined first switching condition may be a second media content generated based on the first user, switching operation is performed on the display state of the partial region in the first media content.

Alternatively, different second media content may correspond to different regions of the first media content, the display state of the region can be switched in a targeted manner based on different second media content.

Alternatively, the second media content may not be associated with the display region in the first media content. The switching ratio can be calculated based on the second number of the transmitted first media content and the third number of the generated second media content. The display state switching of the region can be performed based on the switching ratio. For example, the second number of the transmitted first media content can be 5, and the third number of the generated second media content can be 2. Therefore, the switching ratio can be calculated as 2/5 based on the second number and the third number. Therefore, it is possible to switch the display state of 2/5 of the region in the first media content. Herein, the display state of 2/5 of the region in the first media content can be switched randomly, or the display state of 2/5 of the region can be switched in a predetermined switching order. This disclosure is not limited to this.

Thus, after obtaining the second media content, based on the second media content, the display state of the partial region in the first media content can be switched to the predetermined second display state.

Further, on the basis of any of the above embodiments, the switching, based on the obtained second media content, the display state of a partial region in the first media content to the predetermined second display state comprises:

switching, based on the second media content, the display state of a region of the first media content in the first display state that matches the second media content to the second display state.

In the present embodiment, after obtaining the second media content, a region that matches the second media content can be determined according to the second media content. The display state of the region that matches the second media content is switched to the second display state.

The method for displaying a session interface provided in the present embodiment is able to further enhance interaction and display within a session interface by switching, based on the second media content, the display state of a partial region in the first media content to the predetermined second display state, thereby enabling the user to view more diverse contents within the session interface.

Alternatively, on the basis of any of the above embodiments, the first media content is further associated with a predetermined constraint condition; the reply information comprises a second media content.

Step 302 comprises: detecting whether the second media content matches the predetermined constraint condition; and if the second media content matches the predetermined constraint condition, switching the display state of the first media content to the predetermined second display state.

In the present embodiment, the first media content is further associated with the predetermined constraint condition, wherein the predetermined constraint condition may be set based on the actual needs of the second user. For example, the predetermined constraint condition may be a designation of the first user to generate the second media content with the predetermined content, a designation of the first user to generate the second media content associated with a designated location, a designation of the first user to generate the second media content within a designated time period, and the like.

Correspondingly, the reply information can specifically be the second media content. After obtaining the second media content, an recognition operation can be performed on the second media content to determine whether the second media content matches the predetermined constraint condition. For example, the predetermined constraint condition can be to capture a photo including the moon. After obtaining the second media content, an image recognition operation can be performed on the second media content to determine whether the moon is comprised in the second media content.

Further, when the second media content is detected to match the predetermined constraint condition, the display state of the first media content can be switched to the predetermined second display state. Conversely, the first media content can be controlled to be displayed in the first display state.

Figure 7:
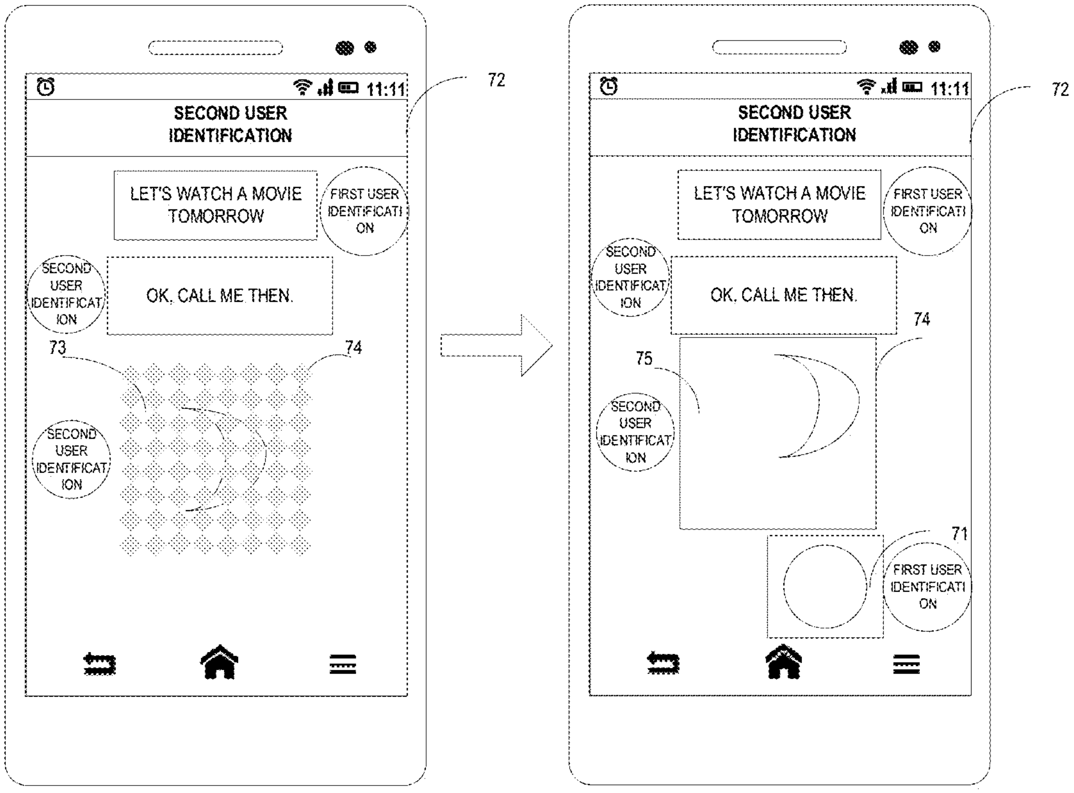
FIG. 7 is a schematic diagram of a display interface provided by another embodiment of the present disclosure.

FIG. 7 is a schematic diagram of a display interface provided by another embodiment of the present disclosure. As shown in FIG. 7, the predetermined constraint condition can be to capture a photo including the moon. When the second media content 71 is not obtained, the first media content 74 can be displayed in the first display state within the session interface 72, wherein the media content cover 73 in the first display state can be a blur display state. After obtaining the second media content 71, it can be detected whether the second media content 71 is a photo including the moon. If so, the display state of the first media content 74 can be switched to a predetermined second display state, wherein the media content cover 75 of the second display state can be a clear display state.

The method for displaying a session interface provided in the present embodiment switches the display state of the first media content to the predetermined second display state when the second media content is detected to match the predetermined constraint condition by predetermining the predetermined constraint condition. Thereby, it is possible to enrich the application scenes of the switching of the display state of the first media content and improve the interaction and display effect of the session content.

Alternatively, on the basis of any of the above embodiments, the first media content is further associated with predetermined question-answering information, the question-answering information comprising question information and predetermined answering information; the reply information comprises a to-be-verified answering. Step 302 comprises:

if the to-be-verified answering is the same as the predetermined answering information, switching the display state of the first media content to the predetermined second display state.

In the present embodiment, the first media content is further associated with the predetermined question-answering information, which may comprise the question information and the predetermined answering information. Correspondingly, the reply information comprises the to-be-verified answering. Herein, the question-answering information can be question-answering information defined by the second user or a question-answering information selected by the second user from a predetermined plurality of question-answering information.

After obtaining the reply information, it is possible to detect whether the to-be-verified answering is the same as the predetermined reply information. If so, the display state of the first media content can be switched to the predetermined second display state.

The method for displaying a session interface provided in the present embodiment switches the display state of the first media content to the predetermined second display state by detecting that the to-be-verified answering generated by the first user is the same as a predetermined reply information, thereby enabling to ensure the information security of the first media content, and accurately display the first media content in the second display state to the first user who answered correctly to the question information.

Alternatively, on the basis of any of the above embodiments, Step 103 comprises:

detecting in real time whether a current time is within a predetermined first time range;

if the current time detected in real time is within the predetermined first time range, switching the display state of the first media content to the predetermined second display state.

In the present embodiment, when the second user transmits the first media content, the first time range may be set for the first media content to cause the first media content to switch the display state to the second display state within that first time range. Correspondingly, the first predetermined condition may namely be to detect whether the current time is within the predetermined first time range.

After obtaining the first media content, the current time can be obtained in real time, and it can be detected whether the current time is within a predetermined first time range; if so, the display state of the first media content can be switched to the predetermined second display state. Conversely, the first media content can be controlled to continue to be displayed in the first display state.

The method for displaying a session interface provided in the present embodiment, by setting a first time range, thereby enabling precise control of the first media content for switching the display state based on the first time range. Thereby, the interaction mode within the session interface is enriched, so that the exchange of the media content is more closely personalized to the needs of the user.

Figure 8:
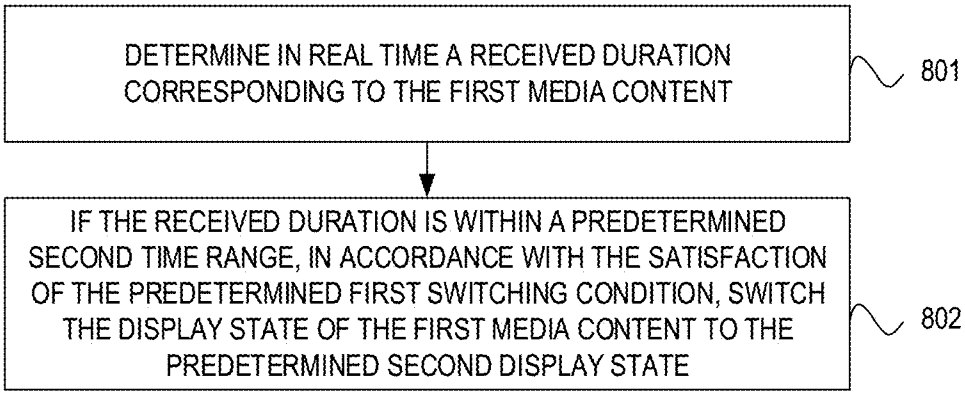
FIG. 8 is a schematic flowchart of a method of displaying a session interface provided by another embodiment of the present disclosure.

FIG. 8 is a schematic flowchart of a method of displaying a session interface provided by another embodiment of the present disclosure. Based on any of the above embodiments, as shown in FIG. 8, Step 103 comprises:

Step 801. Determine in real time a received duration corresponding to the first media content.

Step 802. If the received duration is within a predetermined second time range, in accordance with the satisfaction of the predetermined first switching condition, switch the display state of the first media content to the predetermined second display state.

In the present embodiment, in order to further enhance the interaction and display effect of the first media content within the session interface, the first media content may be caused to switch between the first display state and the second display state within a predetermined second time range. Herein, the predetermined second time range may be set by the first user based on the actual demand, or may be the system default, and the present disclosure does not impose any limitation thereon.

Optionally, the received duration corresponding to the first media content can be determined in real time.

Furthermore, it is possible to detect whether the received duration is within the predetermined second time range. If so, switching between the first display state and the second display state may be performed based on the first switching condition.

For example, the second time range corresponding to the first media content can be two hours, and the received duration corresponding to the first media content can be one hour. That is, the received duration is within the predetermined second time range. Therefore, in accordance with the satisfaction of the predetermined first switching condition, the display state of the first media content can be switched to the predetermined second display state.

Further, on the basis of any of the above embodiments, after Step 801, further comprises:

if the received duration exceeds the predetermined second time range, switching the display state of the first media content to a predetermined third display state; wherein the third display state is used to characterize that the display state of the first media content is unable to be switched to the predetermined second display state.

In the present embodiment, after determining the first media content corresponding to the received duration, it may be detected whether the received duration is within the second predetermined time range, if the received duration exceeds the predetermined second time range, the display state of the first media content can be switched to a predetermined third display state.

Herein, the third display state is used to characterize that the display state of the first media content is unable to be switched to the predetermined second display state. That is, when the first media content is in the third display state, the first user can no longer view the clear first media content.

Alternatively, when the first media content is in the third display state, the prompt information corresponding to the third display state can be displayed at the location associated with the first media content. Herein, the prompt information can be: unchangeable.

The method of displaying a session interface provided by the present embodiment, by setting a second time range thereby causing the first media content to switch between the first display state and the second display state within the predetermined second time range. Thereby enhancing the interaction and display effect.

Figure 9:
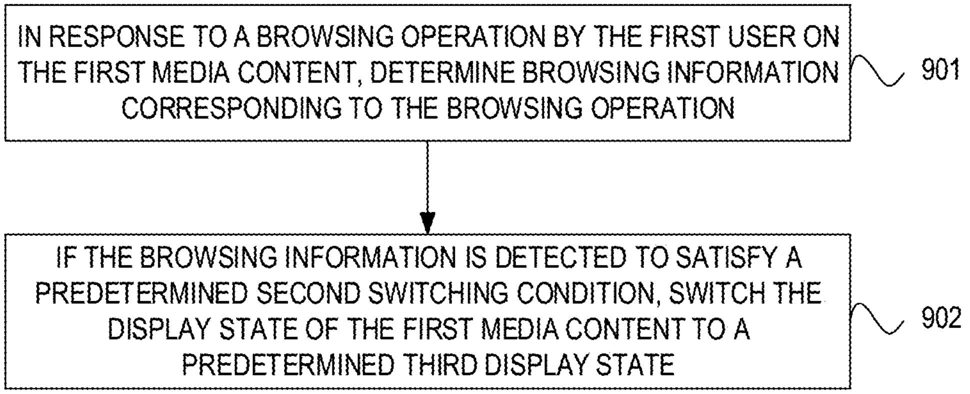
FIG. 9 is a schematic flowchart of a method of displaying a session interface provided by another embodiment of the present disclosure.

FIG. 9 is a schematic flowchart of a method of displaying a session interface provided by another embodiment of the present disclosure. Based on any of the above embodiments, as shown in FIG. 9, after Step 103, further comprises:

Step 901. In response to a browsing operation by the first user on the first media content, determine browsing information corresponding to the browsing operation, the browsing information comprising a number of browsing times and/or a duration of browsing.

Step 902. If the browsing information is detected to satisfy a predetermined second switching condition, switch the display state of the first media content to a predetermined third display state.

The third display state being used for characterizing that the display state of the first media content is unable to be switched to the predetermined second display state.

In the present embodiment, when the second user transmits the first media content, the second switching condition corresponding to the first media content can be set based on the actual demand. Herein, the second switching condition may comprise a number threshold of browsing times for the first media content and/or a duration threshold of browsing for the first media content.

After switching the display state of the first media content to the second display state, the first user can browse the first media content in the second display state. In response to a browsing operation by the first user on the first media content, determine browsing information corresponding to the browsing operation, and the browsing information comprises a number of browsing times and/or a duration of browsing. Herein, the duration of browsing can be the sum of the duration of browsing corresponding to at least one browsing operation performed by the first user. It is detected whether the browsing information satisfies the predetermined second switching condition. If so, the display state of the first media content is switched to the predetermined third display state. Herein, the third display state is used for characterizing that the display state of the first media content is unable to be switched to the predetermined second display state. That is, when the first media content is in the third display state, the first user can no longer view the clear first media content.

Conversely, if the browsing information does not satisfy the predetermined second switching condition, the first media content can be controlled to continue to display in the second display state.

For example, the threshold of the number of browsing times of the first media content may be once. Therefore, if it is detected that the first user has completed a browsing of the first media content in the second display state, the display state of the first media content can be switched to a predetermined third display state. In the third display state, the first user can no longer view the clear first media content.

Figure 10:
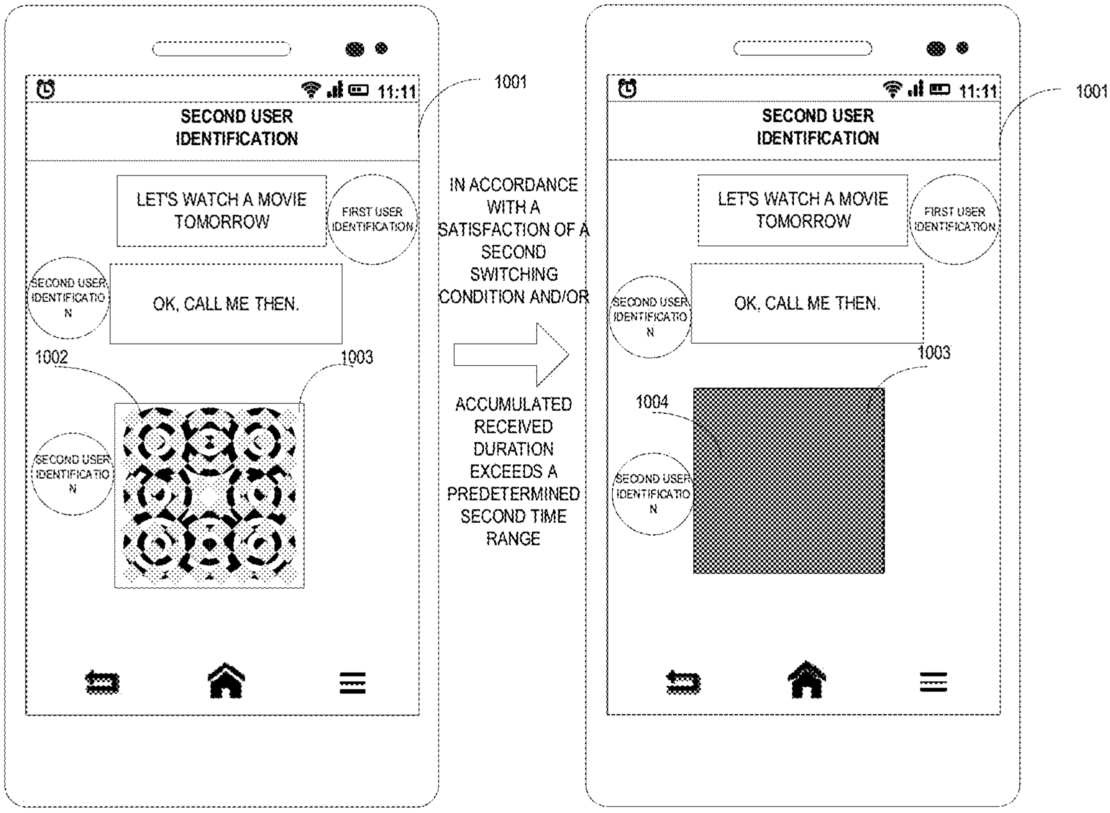
FIG. 10 is a schematic flowchart of a display interface provided by another embodiment of the present disclosure.

FIG. 10 is a schematic flowchart of a display interface provided by another embodiment of the present disclosure. As shown in FIG. 10, the session interface 1001 can display the first media content 1003 in a first display state, wherein the media content cover 1002 in the first display state can be a blur display state. When it is detected that the browsing information satisfies the predetermined second switching condition and/or the received time exceeds the predetermined second time range, the display state of the first media content 1003 can be switched to a predetermined third display state, wherein the media content cover 1004 of the third display state can be an unviewable state.

The method of displaying a session interface provided in the present embodiment obtains browsing information corresponding to the first media content after switching the display state of the first media content to the second display state. The display state of the first media content is switched based on the browsing information and the predetermined second switching condition, thereby causes the display state of the first media content to be different based on different interactive operations.

Further, on the basis of any of the above embodiments. Step 102 comprises:

displaying, within the session interface, at least one predetermined image comprised in the first media content in the first display state, and displaying first prompt information corresponding to the first display state at a location associated with the first media content in the first display state.

In the present embodiment, after obtaining the first media content and displaying, within the session interface, at least one predetermined image comprised in the first media content in the first display state, in order to enable the first user to trigger the corresponding based on the first media content operation to implement switching of the display state of the first media content, a first prompt information corresponding to the first display state can be displayed at a location associated with the first media content in the first display state.

Herein, the location associated with the first media content may be on the first media content of the first display state, or may be a predetermined region around the first media content of the display state, or, alternatively, may be a location set by the first user based on the actual needs, and the present disclosure is not limited thereto.

Optionally, the first prompt information may be different for different application scenes. For example, if the first user needs to reply to the second media content to switch the display state of the first media content, the first prompt information can specifically view the first media content clearly by replying to the second media content. If the first user needs to reply to the problem information associated with the first media content to implement switching the display state of the first media content, the first prompt information can specifically view the first media content clearly for answering the question correctly. If the first user needs to reply to the second media content that satisfies the predetermined constraint condition to implement switching the display state of the first media content, the first prompt information can specifically view the first media content clearly by transmitting the second media content that satisfies the xx condition.

Figure 11:
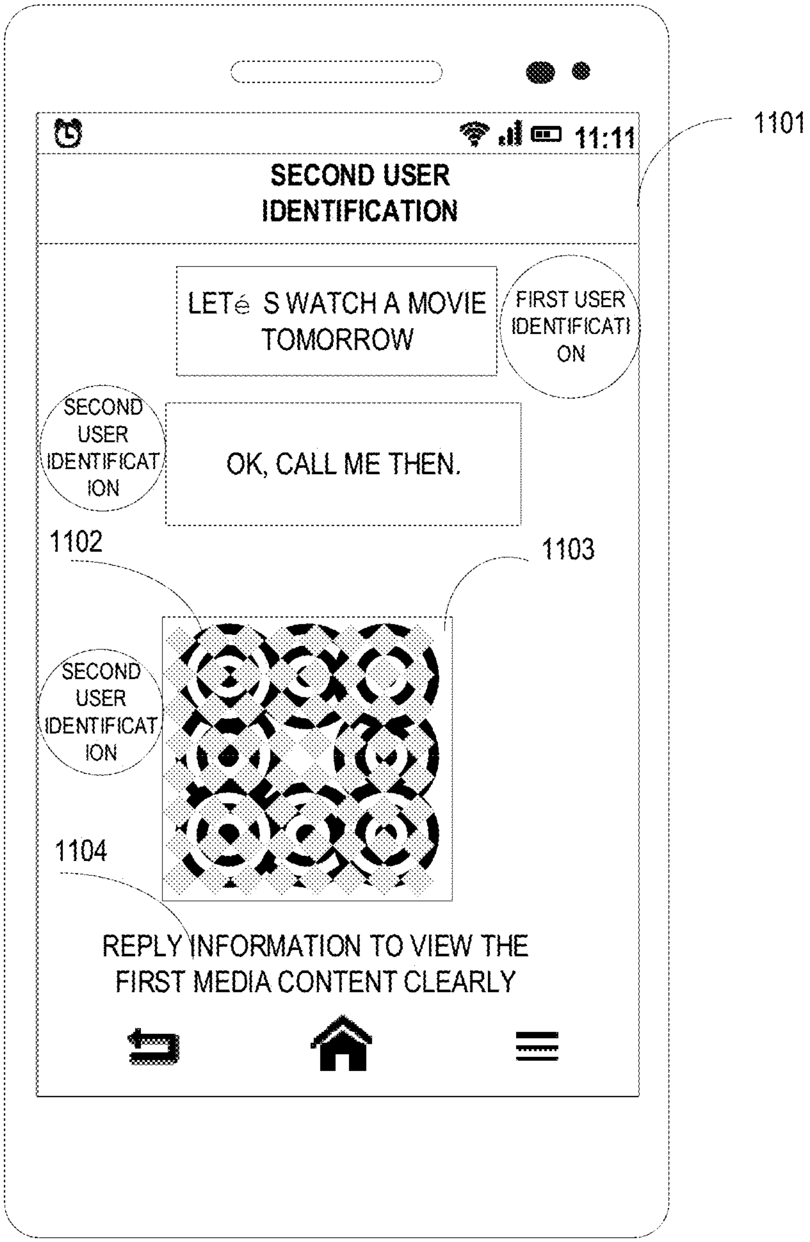
FIG. 11 is a schematic flowchart of a display interface provided by another embodiment of the present disclosure.

FIG. 11 is a schematic flowchart of a display interface provided by another embodiment of the present disclosure. As shown in FIG. 11, the first media content 1103 in the first display state can be displayed within the session interface 1111, and the media content cover 1102 in the first display state can be a blur display state. The first prompt information 1104 is also displayed below the first media content 1103. The first prompt information 1104 can be used to view the first media content clearly as reply information.

The method of displaying a session interface provided by the present embodiment implements a first prompt information corresponding to the first display state by displaying a first prompting information at a location associated with the first media content of the first display state, thereby enabling a first user to accurately trigger a corresponding operation to implement switching of the display state of the first media content based on the first prompt information. The accuracy of the switching of the state of the first media content is improved.

Further, on the basis of any of the above embodiments, after Step 102, further comprises:

in response to a trigger operation by the first user on the first media content in the first display state, jumping across to a preview interface; and displaying, in the preview interface, the first media content in the first display state and at least one reply content obtaining control.

In the present embodiment, after obtaining the first media content and displaying the first media content in the first display state within the session interface, the first user may trigger the first media content in the first display state.

Within the preview interface, the first media content can be displayed in a larger screen region than within the session interface, for example, the first media content in the first display state can be displayed in full screen, or the first media content in the first display state can be displayed in a specified display region. In addition, in order to enable the first user to quickly switch the display state of the first media content based on the generation of reply information of the first media content, at least one reply content obtaining control is also displayed in the preview interface. Therefore, the first user can generate reply information by triggering the at least one reply content obtaining control.

Figure 12:
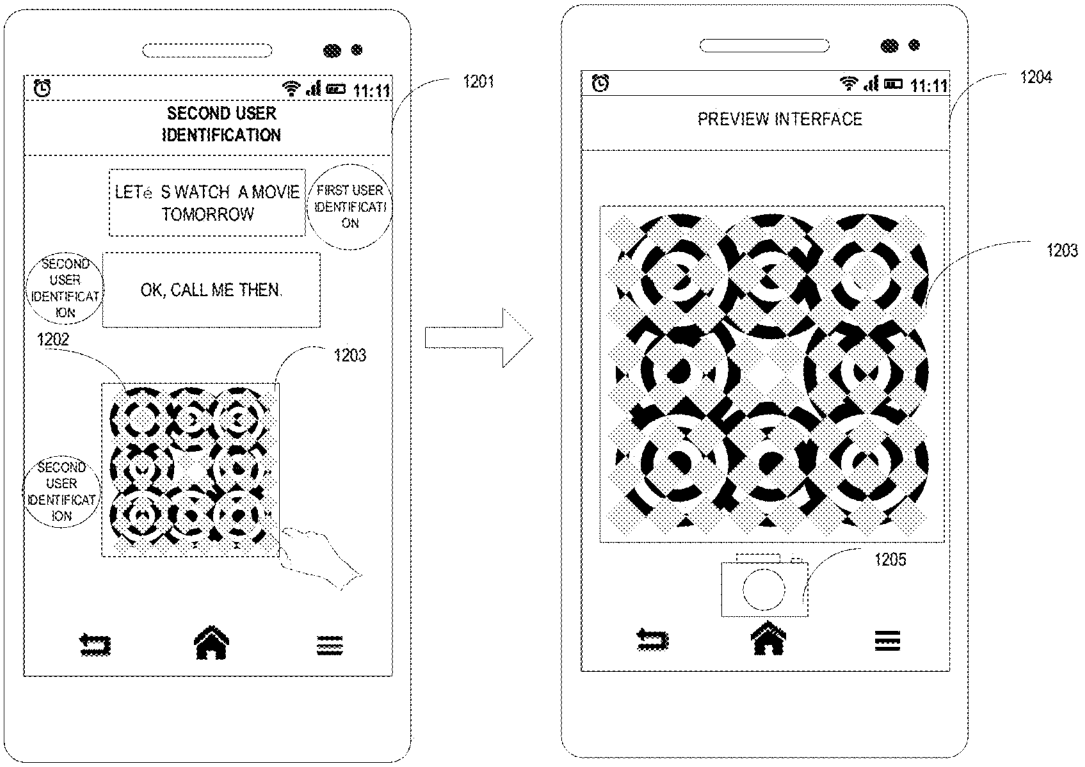
FIG. 12 is a schematic flowchart of a display interface provided by another embodiment of the present disclosure.

FIG. 12 is a schematic flowchart of a display interface provided by another embodiment of the present disclosure. As shown in FIG. 12, the first media content 1203 in the first display state may be displayed within the session interface 1212, wherein the media content cover 1202 in the first display state may be a blur display state. In response to a trigger operation performed by the first user on the first media content 1203 in the first display state, it is possible to jump across to a preview interface 1204. Herein the preview interface 1204 displays the first media content 1203 in the first display state and the at least one reply content obtaining control 1205.

Further, on the basis of any of the above embodiments. Step 102 comprises:

displaying, within the session interface, at least one predetermined image comprised in the first media content in the first display state, and displaying at least one reply content obtaining control at a location associated with the first media content in the first display state.

In the present embodiment, after obtaining the first media content and displaying at least one predetermined image included in the first media content in the first display state within the session interface, in order to enable the first user to quickly generate reply information based on the first media content to switch the display state of the first media content, at least one reply content obtaining control may further be displayed at a location associated with the first media content in the first display state.

Figure 13:
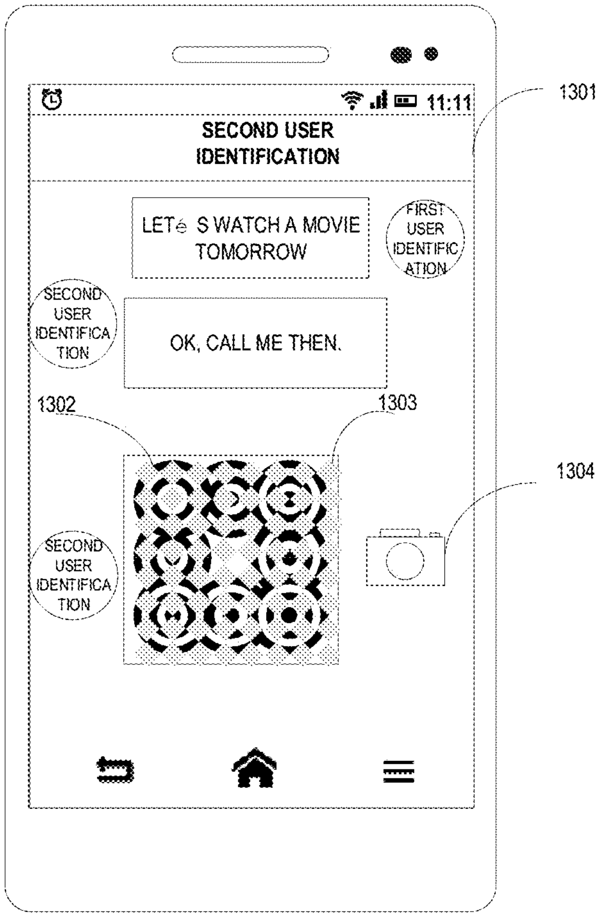
FIG. 13 is a schematic flowchart of a display interface provided by another embodiment of the present disclosure.

FIG. 13 is a schematic flowchart of a display interface provided by another embodiment of the present disclosure. As shown in FIG. 13, the first media content 1303 in the first display state can be displayed within the session interface 1313, wherein the media content cover 1302 in the first display state can be a blur display state. The location associated with the first media content 1303 in the first display state can further display the reply content obtaining control 1304.

The method of displaying a session interface provided by the present embodiment, by displaying a predetermined reply content obtaining control within a preview interface and/or a session interface, thereby enable the first user to quickly implement the generation of a reply message by triggering the reply content obtaining control. The first user can then quickly implement switching of the display state of the first media content based on the reply message. The efficiency of switching the display state of the first media content is improved.

Alternatively, on the basis of any of the above embodiments, the method further comprises:

in response to a trigger operation by the first user on a reply information obtaining control, jumping across to a media content obtaining interface; and in response to a media content obtaining operation triggered by the first user within the media content obtaining interface, obtaining the reply information, wherein the reply information comprises a second media content.

In the present embodiment, the reply information may specifically be the second media content. The second media content comprises but is not limited to image media content and video media content.

By displaying a predetermined reply content obtaining control within the preview interface and/or session interface, the first user can thereby trigger the display of a predetermined reply content obtaining control within the preview interface and/or session interface. In response to the trigger operation, it is impossible to jumped across to the media content obtaining interface.

The first user can trigger the media content obtaining operation within the media content obtaining interface, to implement the generation of reply information.

Further, on the basis of any of the above embodiments, the in response to a media content obtaining operation triggered by the first user within the media content obtaining interface, obtaining the reply information comprises:

performing, based on a trigger operation by the first user on a predetermined collection control within the media content obtaining interface, a collection operation on media content by using a predetermined media content collection component to obtain the second media content;

and/or, performing, based on a trigger operation by the first user on a predetermined uploading control within the media content obtaining interface, an uploading operation on media content by using a predetermined media content uploading component to obtain the second media content.

In the present embodiment, the media content obtaining interface may be set with a media content collecting component and/or media content uploading component, and the first user can trigger the operation of the above-described components based on actual needs, to implement the generation of the second media content.

Optionally, based on the trigger operation of the first user on the predetermined collecting control within the media content obtaining interface, the predetermined media content collecting component may be adopted to perform a real-time collecting operation on the media content to obtain the second media content.

Alternatively, based on the trigger operation of the first user on the predetermined uploading control within the media content obtaining interface, the predetermined media content uploading component may be adopted to select the pre-stored media content for the uploading operation of the media content, and the second media content may be obtained.

The method of displaying a session interface provided in the present embodiment jumps across to the media content obtaining interface by in response to the trigger operation of the reply information obtaining control by the first user, thereby the first user can trigger the media content obtaining operation within the media content obtaining interface to generate the second media content. Further, the first user can implement switching of the display state of the first media content based on the second media content. This enriches the interaction mode within the session interface and improves the display effect of the first media content.

Alternatively, on the basis of any of the above embodiments, the method further comprises:

in response to a trigger operation by the first user on a reply information obtaining control, displaying a predetermined reply information input field; and in response to information input by the first user within the reply information input field, obtaining the reply information.

In the present embodiment, the reply information may specifically be the to-be-verified answering of the question information transmitted by the second user. Thus, in response to a trigger operation performed on the reply information obtaining control by the first user, a predetermined reply information input field may be displayed. Optionally, the reply information input field associated with the reply information input field may also display the question information, thereby the first user is able to edit the to-be-verified answering based on the question information. In response to the information input by the first user in the reply information input field, reply information is obtained.

Thereby, it is possible to implement switching of the display state of the first media content based on the reply information in order to enrich the display content as well as the interaction mode within the session interface.

Further, on the basis of any of the above embodiments, after Step 103, further comprises:

in response to a trigger operation by the first user on the first media content in the second display state, jumping across to a preview interface; and displaying, in the preview interface, the first media content in the second display state and second prompt information corresponding to the second display state.

In the present embodiment, after satisfying the predetermined first switching condition, the display state of the first media content is switched to the second display state, in response to a first user trigger operation performed on the first media content in the second display state, and it is possible to jump across to the preview interface.

Within the preview interface, the first media content of the second display state can be displayed. For example, the first media content of the second display state can be displayed in a larger screen region than the session interface in the preview interface. For example, the first media content of the second display state can be displayed in full screen in the preview interface, or the first media content of the second display state can be displayed in the display region specified in the preview interface. The present disclosure does not limit this.

In addition, the second prompt information corresponding to the second display state can also be displayed. Herein, the second prompt information can be: Picture for Picture • What I Obtained.

Further, on the basis of any of the above embodiments, after displaying, in the preview interface, the first media content in the second display state and second prompt information corresponding to the second display state, the method further comprises:

in response to a switching operation triggered by the first user within the preview interface, switching to display reply information generated by the first user.

In the present embodiment, after switching the display state of the first media content to the second display state based on the reply information generated by the first user based on the first media content, the first user may implement switching of viewing the first media content as well as the reply information within the preview interface.

Optionally, after displaying, in the preview interface, the first media content in the second display state, in response to the switching operation triggered by the first user within the preview interface, the reply information generated by the first user can be switched and displayed. Herein, the switching operation may be a sliding operation in a predetermined direction. For example, it may be a left-slide operation, a right-slide operation, an up-slide operation, a down-slide operation, and the like. Alternatively, the switching operation may be a trigger operation such as clicking a predetermined switching control, long press, double click, and the like. The present disclosure does not limit this.

Figure 14:
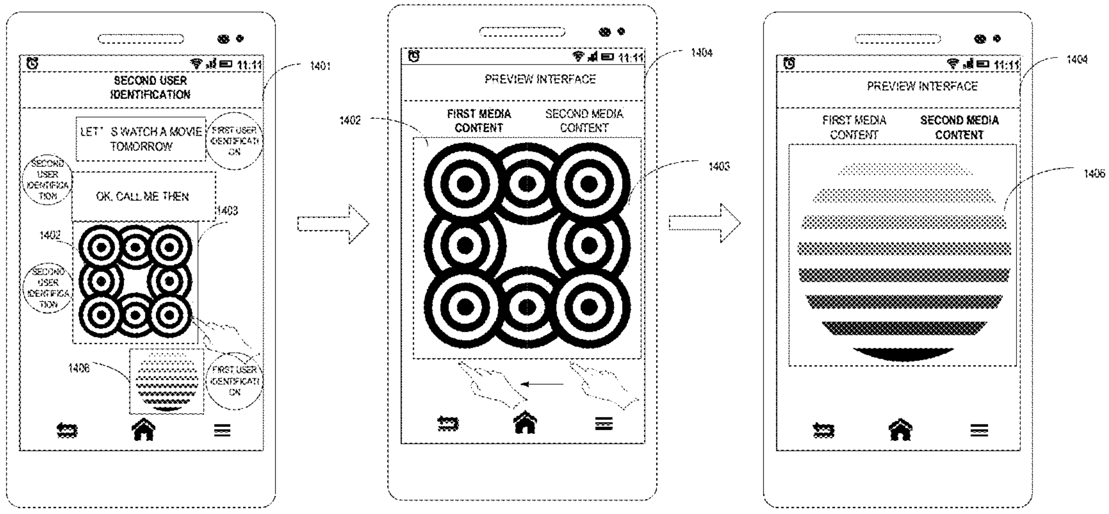
FIG. 14 is a schematic flowchart of a display interface provided by another embodiment of the present disclosure.

FIG. 14 is a schematic flowchart of a display interface provided by another embodiment of the present disclosure. As shown in FIG. 14. In accordance with a satisfaction of the first switching condition, the first media content 1403 in the second display state may be displayed within the session interface 1401, wherein the media content cover 1402 of the second display state may be a clear display state.

The method of displaying a session interface provided in the present embodiment jumps across to the preview interface by responding to a first user's triggering operation on the first media content of the second display state. The first media content and the reply content of the second display state are switched and displayed in the preview interface, so that the first user can obtain more content in the preview interface. In response to a trigger operation of the first user performed on the first media content 1403 in the second display state, it is impossible to jump across to a preview interface 1404, wherein the first media content 1403 in the second display state and the second prompt message 1405 corresponding to the second display state are displayed in the preview interface 1404. In response to a switching operation triggered by the first user in the preview interface 1404, switch to display the response message 1406 generated by the first user, wherein the response message 1406 may be the second media content.

Further, on the basis of any of the above embodiments, after Step 101, further comprises:

determining the display state corresponding to the first media content; and displaying state prompt information associated with the display state within a display region associated with the second user in a predetermined message list interface.

In the present embodiment, there may also be a predetermined message list interface, wherein the message list interface may be a list of chat conversations of the first user with a plurality of other users with whom a predetermined association exists, wherein the message list interface comprises a display region associated with the second user.

Alternatively, a display state corresponding to the first media content may be determined, wherein the display state corresponding to the first media content may comprise a first display state, a second display state, and a third display state.

In order to enable the first user to intuitively determine the display state of the first media content in the message list interface, state prompt information associated with the display state may be displayed in a display region associated with the second user in the predetermined message list interface.

For example, when the display state of the first media content is a first display state, the state prompt information may be: the second user transmitted the first media content to be viewed. When the display state of the first media content is a second display state, the state prompt information may be: the reply information has viewed the first media content. When the display state of the first media content is a third display state, the state prompt information may be: the first media content is expired.

The method of displaying a session interface provided by the present embodiment provides that by displaying the state prompt information associated with the display state in the display region associated with the second user in the predetermined message list interface, the first user is thereby able to intuitively determine the display state of the first media content in the message list interface, which is thereby able to prevent the first user from missing the view of the first media content.

Further, on the basis of any of the above embodiments, after Step 101, further comprises:

- determining the display interface type currently displayed; and
- if the display interface type is different from the session interface, displaying a media content reception reminder control, and the media content reception reminder control comprising prompt information corresponding to the first media content and a view control.

In the present embodiment, in order to avoid the first user from missing a view of the first media content, a display interface type currently displayed may also be determined. If the currently displayed interface is a non-session interface, a media content receiving reminder control may be displayed, and the media content receiving reminder control comprises a reminder message corresponding to the first media content and a view control. Herein the media content reception reminder control displays prompt information, for example, the prompt information may be: the second user transmit a first media content for you to exchange.

Herein, the media content receiving reminder control can be displayed in a form of a pop-up window. Alternatively, it can be displayed in any other form, to which the present disclosure is not limited.

Further, on the basis of any of the above embodiments, the displaying a media content reception reminder control further comprises:

- in respond to the trigger operation on the view control by the first user, jumping across to the preview interface; and
- displaying the first media content in the first display state and the prompt information corresponding to the first display state within the preview interface.

In the present embodiment, the first user can preform a trigger operation on the view control in the media content receiving reminder control. In response to the trigger operation, the first media content in the first display state can be displayed in a larger screen region than the session interface within the preview interface. For example, the first media content in the first display state can be displayed in full screen within the preview interface, or the first media content in the first display state can be displayed in the display region specified within the preview interface. The present disclosure does not limit this.

Within the preview interface, the first media content in the first display state and the prompt information corresponding to the first display state can be displayed. Herein, the prompt information corresponding to the first display state can be: the first media content can be viewed clearly by exchanging reply information.

The method of displaying a session interface provided that, by the present embodiment provided that when the current display interface is a non-session interface, the media content receiving reminder control is displayed, thereby enabling to avoid the first user from missing the view of the first media content. In addition, it is possible to quickly implement viewing operation on the first media content.

Figure 15:
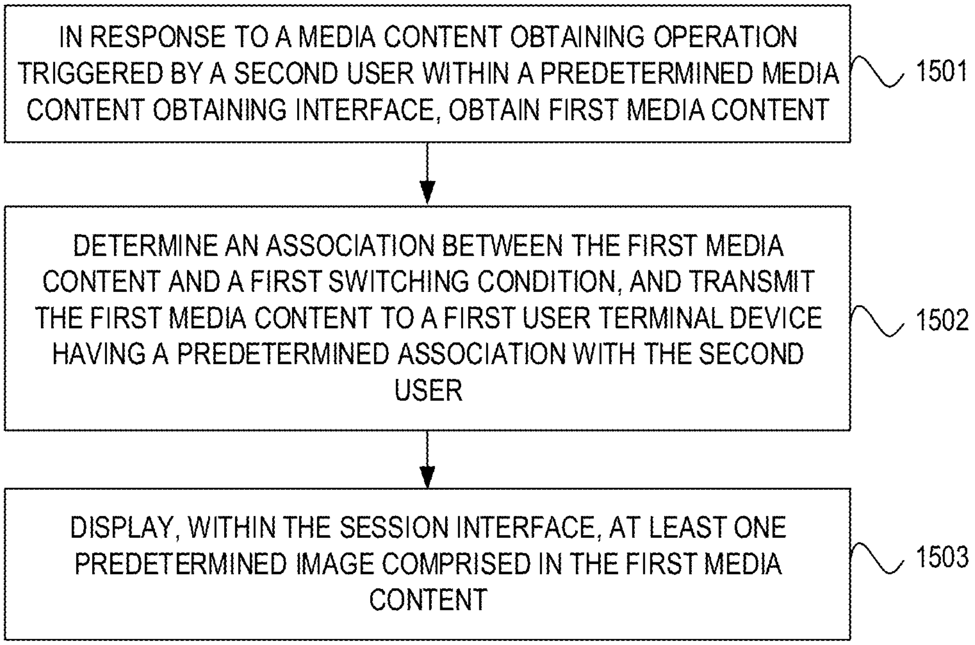
FIG. 15 is a schematic flowchart of a method of displaying a session interface provided by another embodiment of the present disclosure.

FIG. 15 is a schematic flowchart of a method of displaying a session interface provided by another embodiment of the present disclosure, applied to a client of the second user. As shown in FIG. 15, the method comprises:

Step 1501. In response to a media content obtaining operation triggered by a second user within a predetermined media content obtaining interface, obtain first media content.

Step 1502. Determine an association between the first media content and a first switching condition, and transmit the first media content to a first user having a predetermined association with the second user, to enable a display state of the first media content in a session interface of the first user to be adjusted based on a predetermined first switching condition.

Step 1503. Display within the session interface at least one predetermined image comprised in the first media content in the predetermined first display state or in a predetermined second display state.

The executive object of the present embodiment is the terminal device of the second user, and the terminal device can be set with the client of the second user. The terminal device can communicate and connect with the terminal device of the first user, thereby transmitting the first media content to the terminal device of the first user and displaying the first media content.

In the present embodiment, during the session between the first user and the second user, the second user may trigger a media content obtaining operation within a predetermined media content obtaining interface to implement obtaining of the first media content. Optionally, the second user, when generating the first media content, may also predetermine an association with the first media content with the first switching condition.

The second user can transmit the first media content to the first user, wherein the second user can be a user who has a predetermined association with the first user. For example, the second user can be a friend who follows each other with the first user, or the second user can be a user who has unilateral followership with the first user, or the second user can be an address book friend of the first user, etc.

This first media content comprises, but is not limited to, picture media content, video media content, and the like. The number of such first media content may be at least one.

After the first media content is transmitted to the first user, the at least one predetermined image included in the first media content may also be displayed within the session interface.

Correspondingly, after obtaining the first media content, the terminal device of the first user can display the first media content in the predetermined first display state within the session interface. Herein, the session interface can be a chat session interface between the first user and the second user. The first display state can be a blur display state. In the first display state, the first user cannot view the clear first media content, thereby he can not obtain all the information of the first media content. Herein, the blur display state comprises but is not limited to Gaussian blur and Mosaic blur. In accordance with the satisfaction of the predetermined first switching condition, the display state of the first media content can be switched to a predetermined second display state. Herein, the second display state can be a clear display state. In the second display state, the first user can view the clear first media content.

The method for displaying a session interface provided in the present embodiment is provided by transmitting the first media content to a first user after generating the first media content, thereby enabling the terminal device of the first user to display the at least one predetermined image included in the first media content in the first display state within the session interface and to switch the display state of the first media content in accordance with a satisfaction of the predetermined first switching condition. Thereby, the interactive content within the session interface can be enriched, and the display state of the interactive content can be enriched.

Further, on the basis of any of the above embodiments. Step 1503 comprises:

displaying, within the session interface, at least one predetermined image comprised in the first media content in the predetermined first display state;

in accordance with a satisfaction of the predetermined first switching condition, switching the display state of the first media content to a predetermined second display state; or Step 1503 comprises:

displaying, within the session interface, at least one predetermined image comprised in the first media content in the predetermined second display state.

In the present embodiment, the display mode of the first media content within the session interface of the second user can be the same as that within the session interface of the first user. At least one predetermined image included in the first media content can be displayed within the session interface in the predetermined first display state. And it is determined in real time whether the current predetermined first switching condition is satisfied. If so, the display state of the first media content can be switched to a predetermined second display state.

Alternatively, since the first media content is generated by the second user, at least one predetermined image contained in the first media content can be displayed directly within the session interface in a predetermined second display state. Optionally, in order to enable the second user to understand the display state of the first media content within the first user client, the display state of the first media content in the first user client can also be displayed at the display location associated with the first media content.

Optionally, the second user can choose any of the above display methods to display the first media content based on actual needs, and the present disclosure does not limit this.

The method of displaying a session interface provided by the present embodiment, by setting a different display mode of the first media content, thereby enable the display mode of the first media content to be different based on different interactive operations, and can further improve the display effect within the session interface.

Further, on the basis of any of the above embodiments, after Step 1503, further comprises:

in response to a trigger operation by the second user on the first media content, jumping across to a predetermined preview interface; and displaying the first media content in the preview interface.

In the present embodiment, after the first media content is displayed within the session interface, the second user can perform a trigger operation on the first media content. In response to the trigger operation, it is possible to jump across to a predetermined preview interface and displayed within the predetermined preview interface. Herein, the first media content can be displayed in a larger screen region than the session interface within the preview interface. For example, the first media content can be displayed in full screen within the preview interface or in a display region specified within the preview interface. The present disclosure does not limit this.

Alternatively, prompt information associated with the display state of the first media content within the first user client may be displayed within the preview interface. For example, when the display state of the first media content within the first user client is a first display state, the prompt information may be: transmitted, waiting for the first user to reply to the information exchange.

Alternatively, the first media content of the second display state may be displayed within the preview interface. Optionally, the display state of the first media content within the session interface of the second user may be enabled to be the same as the display state within the session interface of the first user. For example, when the display state of the first media content within the first user client is a first display state, display the first media content of the first display state within the preview interface.

Further, on the basis of any of the above embodiments, after the displaying the first media content in the preview interface, the method further comprises:

if a reply message transmitted by the first user is obtained, in response to a switching operation by the second user within the preview interface, switching to display the reply message.

In the present embodiment, if the reply information transmitted by the first user is obtained, the first media content and the reply information can be switched to be viewed within the preview interface.

Alternatively, if the reply information transmitted by the first user is obtained, in response to a switching operation of the second user within the preview interface, the display of the reply information is switched. Herein, the switching operation may be a sliding operation in a predetermined direction. For example, it may be a left-sliding operation, a right-sliding operation, an up-sliding operation, a down-sliding operation, and the like. Alternatively, the switching operation may be a trigger operation such as clicking the preset switching control, long press, double click, and the like. The present disclosure does not limit this.

The method of displaying a session interface provided in the present embodiment, by switching the display state of the first media content and reply content in the preview interface, thereby enable the second user to obtain more content in the preview interface.

Further, on the basis of any of the above embodiments, the preview interface further comprises a predetermined condition editing control; the after displaying the first media content in the preview interface further comprises:

in response to a trigger operation by the second user on the condition editing control, obtaining a predetermined constraint condition input by the second user; and establishing an association between the first media content and the predetermined constraint condition.

In the present embodiment, the preview interface further comprises the predetermined condition editing control. After the first media content is transmitted to the first user, the predetermined constraint information associated with the first media content can be determined by triggering the condition editing control.

Alternatively, in response to a trigger operation on the condition edit control by the second user, a predetermined constraint condition input by the second user may be obtained. An association between the first media content and the predetermined constraint condition is established.

Alternatively, on the basis of any of the above embodiments, the media content obtaining interface comprises a predetermined condition editing control, and Step 1502 comprises:

in the present embodiment, the media content obtaining interface comprises a predetermined condition editing control. The second user may input a predetermined constraint condition associated with the first media content by triggering the predetermined condition edit control during the process of generating the first media content in the media content obtaining interface and establish an association between the predetermined constraint condition and the first media content.

Alternatively, after the first media content is transmitted to the first user, the predetermined constraint condition associated with the first media content can be updated by triggering the condition editing control within the preview interface.

The method of displaying a session interface provided by the present embodiment, by setting a condition editing control within the preview interface, thereby enabling a second user to implement an editing operation of the predetermined constraint condition based on the condition editing control.

Further, on the basis of any of the above embodiments, Step 1501 comprises:

in response to a media content processing request triggered by the second user within the session interface, jumping across to a media content obtaining interface, and the session interface being a session interface associated with the first user and the second user;

obtaining a first media content, based on a media content obtaining operation triggered by the second user within the media content obtaining interface.

In the present embodiment, the second user may trigger a media content processing request within the session interface. In response to that media content processing request, it is possible to jump across to the media content obtaining interface. The second user may trigger a media content obtaining operation within the media content obtaining interface to implement a generation of the first media content.

Further, on the basis of any of the above embodiments, the in response to a media content processing request triggered by the second user within the session interface, jumping across to a media content obtaining interface comprises:

in response to a triggered operation by the second user within a predetermined session interface on an exchange control displayed within a predetermined display region, jumping across to the media content obtaining interface.

Alternatively, the exchange control may be predetermined within the session interface. The exchange control may be set in a preset display region within the session interface, which may be the bottom of the session interface, or may be the top of the session interface, or may be any position that does not obscure the content of the session, and the present disclosure does not limit this.

The second user may perform a trigger operation on the exchange control based on actual needs. In response to the trigger operation by the second user on the exchange control displayed within the predetermined display area within the predetermined session interface, it is possible to jump across to the media content obtaining interface.

Further, on the basis of any of the above embodiments, the session interface comprises a predetermined function control; and in response to a media content processing request triggered by the second user within the session interface, jumping across to a media content obtaining interface comprises:

in response to a trigger operation by the second user on the function control within the chat session interface, displaying a predetermined function list in the chat session interface; and in response to a trigger operation by the second user on a predetermined exchange control within the function list, jumping across to the media content obtaining interface.

Alternatively, the session interface comprises a predetermined function control. In response to a trigger operation by the second user on the function control, a predetermined function list may be displayed in the chat session interface, wherein the function list comprises the exchange control. The second user may perform a trigger operation on the exchange control based on actual needs. In response to the trigger operation of the second user on the exchange control displayed in the predetermined display region within the predetermined session interface, jumping across to a media content obtaining interface is done.

Further, on the basis of any of the above embodiments, obtaining a first media content, based on a media content obtaining operation triggered by the second user within the media content obtaining interface comprises:

performing, based on a trigger operation by the second user on a predetermined collection control within the media content obtaining interface, a collection operation on media content by using a predetermined media content collection component to obtain the first media content;

and/or, performing, based on a trigger operation by the second user on a predetermined uploading control within the media content obtaining interface, an uploading operation on media content by using a predetermined media content uploading component to obtain the first media content.

In the present embodiment, the media content obtaining interface may be set with a media content collecting component and/or media content uploading component, and the second user can trigger the operation of the above-described components based on actual needs, to implement the generation of the second media content.

Alternatively, it is impossible to, based on a trigger operation by the second user on a predetermined collection control within the media content obtaining interface, perform a collection operation on media content by using a predetermined media content collection component to obtain the second media content.

Alternatively, it is impossible to, based on a trigger operation by the second user on a predetermined uploading control within the media content obtaining interface, perform an uploading operation on media content by using a predetermined media content uploading component to obtain the second media content.

The method of displaying a session interface provided in the present embodiment enables a generation of the first media content by triggering a media content obtaining operation by the second user within the media content obtaining interface. Further, it is possible to implement the exchange of reply information based on the first media content. The interaction mode within the session interface is enriched and the display effect of the first media content is improved.

Figure 16:
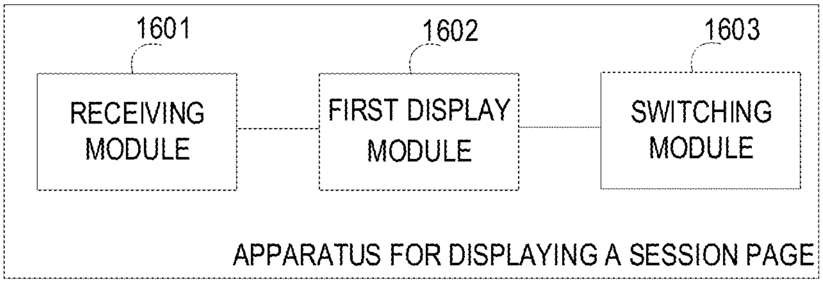
FIG. 16 is a schematic flowchart of an apparatus for displaying a session interface provided by an embodiment of the present disclosure.

FIG. 16 is a schematic flowchart of an apparatus for displaying a session interface provided by an embodiment of the present disclosure, applied to the client of the first user. As shown in FIG. 16, the apparatus comprises: a receiving module 1601, a first display module 1602, and a switching module 1603. The receiving module 1601 is configured to receive a first media content transmitted by a second user having a predetermined association with a first user. The first display module 1602 is configured to display within a session interface at least one predetermined image comprised in the first media content in a first display state. The switching module 1603 is configured to, in accordance with a satisfaction of a predetermined first switching condition, switch the display state of the first media content to a predetermined second display state.

Further, based on any of the above embodiments, the first display module is configured to: perform blur processing on the at least one predetermined image comprised in the first media content to obtain the first media content in the first display state; and display within the session interface the first media content in the first display state.

Further, on the basis of any of the above embodiments, the first display module is configured to: if the first media content is picture media content, perform blur processing on at least one picture comprised in the first media content to obtain the first media content in the first display state, wherein the first media content comprises at least one picture; and if the first media content is video media content, perform blur processing on a predetermined image frame of the first media content to obtain the first media content in the first display state.

Further, on the basis of any of the above embodiments, the first display module is configured to: perform Gaussian blur processing and/or Mosaic processing on the at least one predetermined image comprised in the first media content to obtain the first media content in the first display state.

Further, on the basis of any of the above embodiments, the switching module is configured to: obtain reply information generated by the first user based on the first media content; and if the reply information satisfies the predetermined first switching condition, switch the display state of the first media content to the predetermined second display state.

Further, on the basis of any of the above embodiments, the switching module is configured to: in response to a predetermined operation triggered by the first user on the first media content, jump across to a predetermined reply interface; and obtain the reply information based on media content obtained or reply content input by the first user within the reply interface.

Further, on the basis of any of the above embodiments, the reply information comprises second media content generated by the first user based on the first media content. The switching module is configured to: in accordance with a determination that the second media content generated by the first user is obtained, switch the display state of the first media content to the predetermined second display state.

Further, on the basis of any of the above embodiments, the number of the first media content is at least one. The switching module is configured to: in accordance with a determination that the second media content is obtained, switch the display state of respective first media content to the predetermined second display state; or, in accordance with a detection that the number of the second media content is the same as the number of the first media content, switch the display state of respective first media content to the predetermined second display state; or, determine a first number of the generated second media content; and switch the display state of the first number of first media content to the predetermined second display state.

Further, on the basis of any of the above embodiments, the switching module is configured to: switch, based on the obtained second media content, the display state of a partial region in the first media content to the predetermined second display state.

Further, on the basis of any of the above embodiments, the switching module is configured to: switch, based on the second media content, the display state of a region in the first media content in the first display state that matches the second media content to the second display state.

Further, on the basis of any of the above embodiments, the first media content is further associated with a predetermined constraint condition: the reply information comprises a second media content. The switching module is configured to: detect whether the second media content matches the predetermined constraint condition; and if the second media content matches the predetermined constraint condition, switch the display state of the first media content to the predetermined second display state.

Further, on the basis of any of the above embodiments, the first media content is further associated with predetermined question-answering information, the question-answering information comprising question information and predetermined answering information; the reply information comprises an to-be-verified answering. The switching module is configured to: if the to-be-verified answering is the same as the predetermined answering information, switch the display state of the first media content to the predetermined second display state.

Further, on the basis of any of the above embodiments, the switching module is configured to: detect in real time whether a current time is within a predetermined first time range; if the current time detected in real time is within the predetermined first time range, switch the display state of the first media content to the predetermined second display state.

Further, on the basis of any of the above embodiments, the switching module is configured to: determine in real time a received duration corresponding to the first media content; and if the received duration is within a predetermined second time range, in accordance with the satisfaction of the predetermined first switching condition, switch the display state of the first media content to the predetermined second display state.

Further, on the basis of any of the above embodiments, the switching module is further configured to: if the received duration exceeds the predetermined second time range, switch the display state of the first media content to a predetermined third display state; wherein the third display state is used to characterize that the display state of the first media content is unable to be switched to the predetermined second display state.

Further, on the basis of any of the above embodiments, the switching module is configured to: in response to a browsing operation by the first user on the first media content, determine browsing information corresponding to the browsing operation, the browsing information comprising a number of browsing times and/or a duration of browsing; if the browsing information is detected to satisfy a predetermined second switching condition, switch the display state of the first media content to a predetermined third display state; and the third display state is used for characterizing that the display state of the first media content is unable to be switched to the predetermined second display state.

Further, on the basis of any of the above embodiments, the first display module is configured to: display, within the session interface, at least one predetermined image comprised in the first media content in the first display state, and display first prompt information corresponding to the first display state at a location associated with the first media content in the first display state.

Further, on the basis of any of the above embodiments, the apparatus further comprises: a jumping module configured to, in response to a trigger operation by the first user on the first media content in the first display state, jump across to a preview interface. The first display module further configured to display; in the preview interface, the first media content in the first display state and at least one reply content obtaining control.

Further, on the basis of any of the above embodiments, the first display module is configured to: display within the session interface at least one predetermined image comprised in the first media content in the first display state, and display at least one reply content obtaining control at a location associated with the first media content in the first display state.

Further, on the basis of any of the above embodiments, the apparatus further comprises: the jumping module further configured to, in response to a trigger operation by the first user on a reply information obtaining control, jump across to a media content obtaining interface. A reply module configured to, in response to a media content obtaining operation triggered by the first user within the media content obtaining interface, obtain the reply information, wherein the reply information comprises a second media content.

Further, on the basis of any of the above embodiments, the reply module is configured to: perform, based on a trigger operation by the first user on a predetermined collection control within the media content obtaining interface, a collection operation on media content by using a predetermined media content collection component to obtain the second media content; and/or, perform, based on a trigger operation by the first user on a predetermined uploading control within the media content obtaining interface, an uploading operation on media content by using a predetermined media content uploading component to obtain the second media content.

Further, on the basis of any of the above embodiments, the apparatus further comprises: the first display module further configured to, in response to a trigger operation by the first user on a reply information obtaining control, display a predetermined reply information input field. The reply module configured to, in response to information input by the first user within the reply information input field, obtain the reply information.

Further, on the basis of any of the above embodiments, the apparatus further comprises: the jumping module further configured to, in response to a trigger operation by the first user on the first media content in the second display state, jump across to a preview interface. The first display module further configured to display, in the preview interface, the first media content in the second display state and second prompt information corresponding to the second display state.

Further, on the basis of any of the above embodiments, the apparatus further comprising: a switching module configured to, in response to a switching operation triggered by the first user within the preview interface, switch to display reply information generated by the first user.

Further, on the basis of any of the above embodiments, the apparatus further comprises: a determining module configured to determine the display state corresponding to the first media content. The first display module configured to display state prompt information associated with the display state within a display region associated with the second user in a predetermined message list interface.

Figure 17:
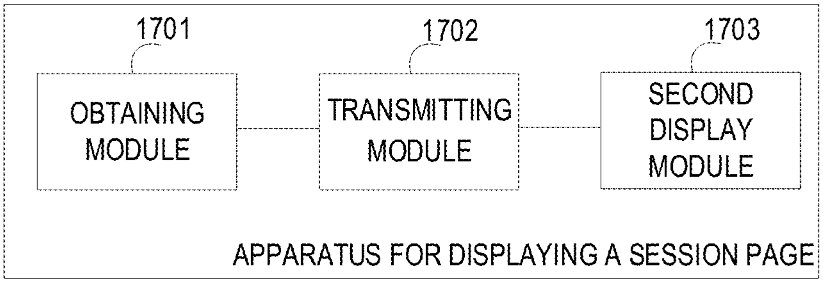
FIG. 17 is a structural schematic diagram of an apparatus for displaying a session interface provided by an embodiment of the present disclosure.

FIG. 17 is a structural schematic diagram of an apparatus for displaying a session interface provided by an embodiment of the present disclosure, applied to the client of the second user. As shown in FIG. 17, the apparatus comprises: an obtaining module 1701, a transmitting module 1702, and a second display module 1703. The obtaining module 1701 is configured to, in response to a media content obtaining operation triggered by a second user within a predetermined media content obtaining interface, obtain first media content. The transmitting module 1702 is configured to determine an association between the first media content and a first switching condition, and transmit the first media content to a first user having a predetermined association with the second user, to enable a display state of the first media content in a session interface of the first user to be adjusted based on a predetermined first switching condition. The second display module 1703 is configured to display, within the session interface, at least one predetermined image comprised in the first media content in a predetermined first display state or a predetermined second display state.

Further, on the basis of any of the above embodiments, the second display module is configured to: display within the session interface at least one predetermined image comprised in the first media content in the first display state; in accordance with a satisfaction of the predetermined first switching condition, switch the display state of the first media content to a predetermined second display state; or, the second display module being configured to: display within the session interface at least one predetermined image comprised in the first media content in the second display state.

Further, on the basis of any of the above embodiments, the apparatus further comprises: a interface jumping module configured to, in response to a trigger operation by the second user on the first media content, jump across to a predetermined preview interface. The second display module configured to display the first media content in the preview interface.

Further, on the basis of any of the above embodiments, the apparatus further comprising: an information switching module configured to, if a reply message transmitted by the first user is obtained, in response to a switching operation by the second user within the preview interface, switch to display the reply message.

Further, on the basis of any of the above embodiments, the preview interface further comprises a predetermined condition editing control. The apparatus further comprises: a condition obtaining module configured to, in response to a trigger operation by the second user on the condition editing control, obtain a predetermined constraint condition input by the second user. An establishing module configured to establish an association between the first media content and the predetermined constraint condition.

Further, on the basis of any of the above embodiments, the media content obtaining interface comprises a predetermined condition editing control, the transmitting module is configured to: in response to a trigger operation by the second user on the condition editing control, obtain a predetermined constraint condition input by the second user; and establish the association between the first media content and the predetermined constraint condition as the association between the first media content and the first switching condition.

Devices provided in the present embodiments can be used to perform the technical solutions of the above-described method embodiments, which are similar in terms of the principle of implementation and technical effects, and the present embodiments are not repeated herein.

In order to implement the above embodiments, embodiments of the present disclosure further provide an electronic device comprising: a processor and memory;

the memory storing computer-executable instructions; and the processor executes the computer-executable instructions stored in the memory, to cause the processor to perform the method of displaying a session interface according to any of the above embodiments.

Figure 18:
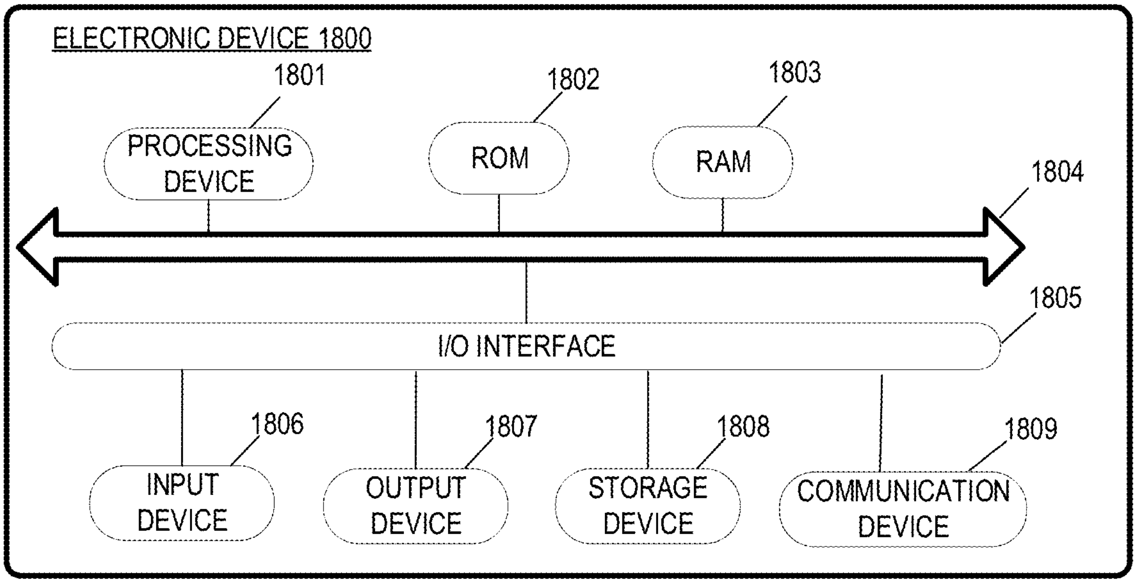
FIG. 18 is a structural schematic diagram of an electronic device provided by an embodiment of the present disclosure.

FIG. 18 is a structural schematic diagram of an electronic device provided by an embodiment of the present disclosure. The electronic device 1800 may be a terminal device or a server. The terminal device may comprise, but is not limited to a cell phone, a laptop computer, a digital broadcast receiver, a Personal Digital Assistant (PDA), a Portable Android Device (PAD), a Portable Media Player (PMP), an in-vehicle terminal (e.g., an in-vehicle navigation terminal), and the like, and fixed terminals such as a digital television (TV), a desktop computer, and the like. The electronic device illustrated in FIG. 18 is merely an example and should not impose any limitations on the functionality and scope of use of embodiments of the present disclosure.

As shown in FIG. 18, the electronic device 1800 may comprise a processing device (e.g., a central processor, a graphics processor, etc.) 1801, which may perform a variety of appropriate actions and processes based on a program stored in Read-Only Memory (ROM) 1802 or loaded from the storage device 1808 into Random Access Memory (RAM) 1803 to perform various appropriate actions and processes. Various programs and data required for operation of the electronic device 1800 are also stored in the RAM 1803. The processing device 1801, the ROM 1802, and the RAM 1803 are connected to respective other via the bus 1804. An input/output (I/O) interface 1805 is also connected to bus 1804.

Generally, the following devices may be connected to the I/O interface 1805: an input device 1806 comprising, for example, a touch screen, a touch pad, a keyboard, a mouse, a video camera, a microphone, an accelerometer, a gyroscope, and the like; an output device 1807 comprising, for example, a liquid crystal display (LCD), a speaker, a vibrator, and the like; a storage device 1808 comprising, for example, a magnetic tape, a hard disk, and the like, and the storage device 1808 being used to store one or more programs; and a communication device 1809. The communication device 1809 may allow the electronic device 1800 to communicate wirelessly or wiredly with other devices to exchange data. Although FIG. 18 illustrates electronic device 1800 with various devices, it should be understood that it is not required to implement or have all of the illustrated devices. More or fewer devices may alternatively be implemented or possessed.

According to the embodiments of the present disclosure, the process described with reference to the flowchart above may be implemented as a computer software program. For example, embodiments of the present disclosure comprise a computer program product comprising a computer program anchored on a non-transitory computer-readable medium, the computer program comprising program code for executing the method shown in the flowchart. In such embodiments, the computer program may be downloaded and installed from a network via the communication device 1809, or from the storage device 1808, or from the ROM 1802. When the computer program is executed by the processing device 1801, the above functions defined in the method of the embodiments of the present disclosure are performed.

It should be noted that the computer-readable medium described above in the present disclosure may be a computer-readable signal medium or a computer-readable storage medium or any combination thereof. The computer-readable storage medium may, for example, be a system, device, or apparatus or device of electricity, magnetism, light, electromagnetism, infrared, or semiconductors, or an electrical connection of any one or more wires, or a combination of the above. The computer-readable storage medium may comprise: portable computer disk, hard disk, random access memory (RAM), read-only memory (ROM), erasable programmable read-only memory (EPROM, or flash memory), optical fiber, compact disc read-only memory (CD-ROM), optical storage device, magnetic storage device, or any suitable combination of the foregoing. For purposes of the present disclosure, a computer-readable storage medium may be any tangible medium that contains or stores a program that may be used by or in combination with an instruction execution system, apparatus, or component. And in the present disclosure, a computer-readable signal medium may comprise a data signal propagated in a baseband or as part of a carrier carrying computer-readable program code. Such propagated data signals may take a variety of forms, comprising electromagnetic signals, optical signals, or any suitable combination of the foregoing. The computer-readable signal medium may also be any computer-readable medium other than a computer-readable storage medium that sends, disseminates, or transmits a program for use by, or in conjunction with, an instruction-executing system, apparatus, or component. The program code contained on the computer-readable medium may be transmitted using any suitable medium, comprising: wire, fiber optic cable, radio frequency (RF), etc., or any suitable combination thereof.

Embodiments of the present disclosure also provide a computer-readable storage medium, wherein the computer-readable storage medium stores computer-executable instructions therein, the computer-executable instructions, when executed by a processor, implementing the method of displaying a session interface according to any of the above embodiments.

Embodiments of the present disclosure also provide a computer program, wherein the computer program, when executed by a processor, implements the method of displaying a session interface according to any of the above embodiments.

The above-described computer-readable medium may be included in the above-described electronic device; or it may be separate and not configured into the electronic device.

The above-described computer-readable medium carries one or more programs which, when the above-described one or more programs are executed by the electronic device, causes the electronic device to execute the method shown in the above-described embodiment.

Computer program code for performing the operations of the present disclosure may be written in one or more programming languages, or combinations thereof, the programming languages comprising object-oriented programming languages, such as Java, Smalltalk, C++, conventional procedural programming languages such as the "C" language, or similar programming languages, or similar programming languages. The program code may be executed entirely on the user's computer, partially on the user's computer, as a separate software package, partially on the user's computer and partially on a remote computer, or entirely on a remote computer or server. In the case of a remote computer, the remote computer may be connected to the user's computer over any kind of network, including a LAN or WAN, or it may be connected to an external computer (e.g., via an Internet connection using an Internet service provider).

The flowcharts and block diagrams in the accompanying drawings illustrate the architecture, functionality, and operation of systems, methods, and computer program products that may be implemented in accordance with various embodiments of the present disclosure. At this point, respective box in the flowcharts or block diagrams may represent a module, program segment, or portion of code that contains one or more executable instructions for implementing a specified logical function. It should also be noted that in some implementations that are determined to be substitutions, the functions indicated in the boxes may also occur in a different order than that indicated in the accompanying drawings. For example, two consecutively represented boxes may actually be executed substantially in parallel, and they may sometimes be executed in reverse order, depending on the function involved. It should also be noted that respective of the boxes in the block diagrams and I or flowcharts, as well as combinations of the boxes in the block diagrams and I or flowcharts, may be implemented in a dedicated hardware-based system that performs the specified function or operation, or may be implemented in a combination of dedicated hardware and computer instructions.

Units described as being involved in embodiments of the present disclosure may be implemented by way of software or may be implemented by way of hardware. Wherein the name of a unit does not in some cases constitute a limitation of the unit itself, for example, a first obtaining unit may also be described as "a unit for obtaining at least two Internet Protocol addresses".

The functions described above herein may be performed, at least in part, by one or more hardware logic components. For example, exemplary types of hardware logic components that may be used include: Field Programmable Gate Array (FPGA), Application Specific Integrated Circuit (ASIC), Application Specific Standard Parts (ASSP), System on Chip (SOC), and System on Chip (SOC), Application Specific Standard Parts (ASSP), System on Chip (SOC), Complex Programmable Logic Device (CPLD) and so on.

In the context of the present disclosure, a machine-readable medium may be a tangible medium that may include or store a program for use by or in conjunction with an instruction execution system, device, or apparatus. The machine-readable medium may be a machine-readable signal medium or a machine-readable storage medium. The machine-readable medium may comprise an electronic, magnetic, optical, electromagnetic, infrared, or semiconductor system, device, or apparatus, or any suitable combination thereof. Machine-readable storage media may comprise an electrical connection According to one or more wires, a portable computer disk, a hard disk, a random access memory (RAM), a read-only memory (ROM), an erasable programmable read-only memory (EPROM or flash memory), a fiber optic, a compact disk-read-only memory (CD-ROM) for convenience, an optical storage device, a magnetic storage device, or any suitable combination of the foregoing, or any suitable combination thereof.

In a first aspect, according to one or more embodiments of the present disclosure, a method of displaying a session interface is provided, applied to a client of a first user, comprising:

receiving a first media content transmitted by a second user having a predetermined association with a first user;

displaying, within a session interface, at least one predetermined image comprised in the first media content in a first display state; and in accordance with a satisfaction of a predetermined first switching condition, switching the display state of the first media content to a predetermined second display state.

According to one or more embodiments of the present disclosure, the displaying, within the session interface, at least one predetermined image comprised in the first media content in a first display state comprises:

performing blur processing on the at least one predetermined image comprised in the first media content to obtain the first media content in the first display state; and displaying, within the session interface, the first media content in the first display state.

According to one or more embodiments of the present disclosure, the performing blur processing on the at least one predetermined image comprised in the first media content to obtain the first media content in the first display state comprises:

if the first media content is picture media content, performing blur processing on at least one picture comprised in the first media content to obtain the first media content in the first display state, wherein the first media content comprises at least one picture; and if the first media content is video media content, performing blur processing on a predetermined image frame of the first media content to obtain the first media content in the first display state.

According to one or more embodiments of the present disclosure, the performing blur processing on the at least one predetermined image comprised in the first media content to obtain the first media content in the first display state comprises:

performing Gaussian blur processing and/or Mosaic processing on the at least one predetermined image comprised in the first media content to obtain the first media content in the first display state.

According to one or more embodiments of the present disclosure, in accordance with a satisfaction of a predetermined first switching condition, switching the display state of the first media content to a predetermined second display state comprises:

obtaining reply information generated by the first user based on the first media content; and if the reply information satisfies the predetermined first switching condition, switching the display state of the first media content to the predetermined second display state.

According to one or more embodiments of the present disclosure, the obtaining reply information generated by the first user based on the first media content comprises:

in response to a predetermined operation triggered by the first user on the first media content, jumping across to a predetermined reply interface; and obtaining the reply information based on media content obtained or reply content input by the first user within the reply interface.

According to one or more embodiments of the present disclosure, the reply information comprises second media content generated by the first user based on the first media content; and the if the reply information satisfies the predetermined first switching condition, switching the display state of the first media content to the predetermined second display state comprises:

in accordance with a determination that the second media content generated by the first user is obtained, switching the display state of the first media content to the predetermined second display state.

According to one or more embodiments of the present disclosure, the number of the first media content is at least one; and the in accordance with a determination that the second media content generated by the first user is obtained, switching the display state of the first media content to the predetermined second display state comprises:

in accordance with a determination that the second media content is obtained, switching the display state of respective first media content to the predetermined second display state;

or, in accordance with a detection that the number of the second media content is the same as the number of the first media content, switching the display state of respective first media content to the predetermined second display state;

or, determining a first number of the generated second media content; and switching the display state of the first number of first media content to the predetermined second display state.

According to one or more embodiments of the present disclosure, the in accordance with a determination that the second media content generated by the first user is obtained, switching the display state of the first media content to the predetermined second display state comprises:

switching, based on the obtained second media content, the display state of a partial region in the first media content to the predetermined second display state.

According to one or more embodiments of the present disclosure, the switching, based on the obtained second media content, the display state of a partial region in the first media content to the predetermined second display state comprises:

switching, based on the second media content, the display state of a region in the first media content in the first display state that matches the second media content to the second display state.

According to one or more embodiments of the present disclosure, the first media content is further associated with a predetermined constraint condition; the reply information comprises a second media content; and if the reply information satisfies the predetermined first switching condition, switching the display state of the first media content to the predetermined second display state comprises:

detecting whether the second media content matches the predetermined constraint condition; and if the second media content matches the predetermined constraint condition, switching the display state of the first media content to the predetermined second display state.

According to one or more embodiments of the present disclosure, the first media content is further associated with predetermined question-answering information, the question-answering information comprising question information and predetermined answering information; the reply information comprises an to-be-verified answering; and if the reply information satisfies the predetermined first switching condition, switching the display state of the first media content to the predetermined second display state comprises:

if the to-be-verified answering is the same as the predetermined answering information, switching the display state of the first media content to the predetermined second display state.

According to one or more embodiments of the present disclosure, the in accordance with a satisfaction of a predetermined first switching condition, switching the display state of the first media content to a predetermined second display state comprises:

detecting in real time whether a current time is within a predetermined first time range;

if the current time detected in real time is within the predetermined first time range, switching the display state of the first media content to the predetermined second display state.

According to one or more embodiments of the present disclosure, the in accordance with a satisfaction of a predetermined first switching condition, switching the display state of the first media content to a predetermined second display state comprises:

determining in real time a received duration corresponding to the first media content; and if the received duration is within a predetermined second time range, in accordance with the satisfaction of the predetermined first switching condition, switching the display state of the first media content to the predetermined second display state.

According to one or more embodiments of the present disclosure, after determining in real time a received duration corresponding to the first media content, the method further comprises:

if the received duration exceeds the predetermined second time range, switching the display state of the first media content to a predetermined third display state; wherein the third display state is used to characterize that the display state of the first media content is unable to be switched to the predetermined second display state.

According to one or more embodiments of the present disclosure, after the in accordance with a satisfaction of a predetermined first switching condition, switching the display state of the first media content to a predetermined second display state, the method further comprises:

in response to a browsing operation by the first user on the first media content, determining browsing information corresponding to the browsing operation, the browsing information comprising a number of browsing times and/or a duration of browsing;

if the browsing information is detected to satisfy a predetermined second switching condition, switching the display state of the first media content to a predetermined third display state; and the third display state being used for characterizing that the display state of the first media content is unable to be switched to the predetermined second display state.

According to one or more embodiments of the present disclosure, the displaying, within the session interface, at least one predetermined image comprised in the first media content in a first display state comprises:

displaying, within the session interface, at least one predetermined image comprised in the first media content in the first display state, and displaying first prompt information corresponding to the first display state at a location associated with the first media content in the first display state.

According to one or more embodiments of the present disclosure, after the displaying, within the session interface, at least one predetermined image comprised in the first media content in a first display state, the method further comprises:

in response to a trigger operation by the first user on the first media content in the first display state, jumping across to a preview interface; and displaying, in the preview interface, the first media content in the first display state and at least one reply content obtaining control.

According to one or more embodiments of the present disclosure, the displaying, within the session interface, at least one predetermined image comprised in the first media content in a first display state comprises:

displaying, within the session interface, at least one predetermined image comprised in the first media content in the first display state, and displaying at least one reply content obtaining control at a location associated with the first media content in the first display state.

According to one or more embodiments of the present disclosure, the method further comprises:

in response to a trigger operation by the first user on a reply information obtaining control, jumping across to a media content obtaining interface; and in response to a media content obtaining operation triggered by the first user within the media content obtaining interface, obtaining the reply information, wherein the reply information comprises a second media content.

According to one or more embodiments of the present disclosure, the in response to a media content obtaining operation triggered by the first user within the media content obtaining interface, obtaining the reply information comprises:

performing, based on a trigger operation by the first user on a predetermined collection control within the media content obtaining interface, a collection operation on media content by using a predetermined media content collection component to obtain the second media content;

and/or, performing, based on a trigger operation by the first user on a predetermined uploading control within the media content obtaining interface, an uploading operation on media content by using a predetermined media content uploading component to obtain the second media content.

According to one or more embodiments of the present disclosure, the method further comprises:

in response to a trigger operation by the first user on a reply information obtaining control, displaying a predetermined reply information input field; and in response to information input by the first user within the reply information input field, obtaining the reply information.

According to one or more embodiments of the present disclosure, after the in accordance with a satisfaction of a predetermined first switching condition, switching the display state of the first media content to a predetermined second display state, the method further comprises:

in response to a trigger operation by the first user on the first media content in the second display state, jumping across to a preview interface; and displaying, in the preview interface, the first media content in the second display state and second prompt information corresponding to the second display state.

According to one or more embodiments of the present disclosure, after displaying, in the preview interface, the first media content in the second display state and second prompt information corresponding to the second display state, the method further comprises:

in response to a switching operation triggered by the first user within the preview interface, switching to display reply information generated by the first user.

According to one or more embodiments of the present disclosure, after receiving a first media content transmitted by a second user having a predetermined association with a first user, the method further comprises:

determining the display state corresponding to the first media content; and displaying state prompt information associated with the display state within a display region associated with the second user in a predetermined message list interface.

Thereby, the interaction within the session interface can be enhanced and the display of the interaction content can be improved.

In a second aspect, according to one or more embodiments of the present disclosure, a method of displaying a session interface is provided, applied to a client of a second user, comprising:

in response to a media content obtaining operation triggered by a second user within a predetermined media content obtaining interface, obtaining first media content;

determining an association between the first media content and a first switching condition, and transmitting the first media content to a first user having a predetermined association with the second user, to enable a display state of the first media content in a session interface of the first user to be adjusted based on a predetermined first switching condition; and displaying, within the session interface, at least one predetermined image comprised in the first media content in a predetermined first display state or in a predetermined second display state.

According to one or more embodiments of the present disclosure, the displaying, within the session interface, at least one predetermined image comprised in the first media content comprises:

displaying, within the session interface, at least one predetermined image comprised in the first media content in the first display state;

in accordance with a satisfaction of the predetermined first switching condition, switching the display state of the first media content to a predetermined second display state; or displaying, within the session interface, at least one predetermined image comprised in the first media content comprising:

displaying, within the session interface, at least one predetermined image comprised in the first media content in the second display state.

According to one or more embodiments of the present disclosure, after displaying, within the session interface, at least one predetermined image comprised in the first media content, the method further comprises:

in response to a trigger operation by the second user on the first media content, jumping across to a predetermined preview interface; and displaying the first media content in the preview interface.

According to one or more embodiments of the present disclosure, after the displaying the first media content in the preview interface, the method further comprises:

if a reply message transmitted by the first user is obtained, in response to a switching operation by the second user within the preview interface, switching to display the reply message.

According to one or more embodiments of the present disclosure, the preview interface further comprises a predetermined condition editing control;

after displaying the first media content in the preview interface, the method further comprises:

in response to a trigger operation by the second user on the condition editing control, obtaining a predetermined constraint condition input by the second user; and establishing an association between the first media content and the predetermined constraint condition.

According to one or more embodiments of the present disclosure, the media content obtaining interface comprises a predetermined condition editing control, and determining the association between the first media content and the first switching condition comprises:

in response to a trigger operation by the second user on the condition editing control, obtaining a predetermined constraint condition input by the second user; and establishing the association between the first media content and the predetermined constraint condition as the association between the first media content and the first switching condition.

In a third aspect, according to one or more embodiments of the present disclosure, an apparatus for displaying a session interface is provided, applied to a client of a first user, comprising:

a receiving module configured to receive a first media content transmitted by a second user having a predetermined association with a first user;

a first display module configured to display within a session interface at least one predetermined image comprised in the first media content in a first display state; and a switching module configured to, in accordance with a satisfaction of a predetermined first switching condition, switch the display state of the first media content to a predetermined second display state.

According to one or more embodiments of the present disclosure, the first display module is configured to:

perform blur processing on the at least one predetermined image comprised in the first media content to obtain the first media content in the first display state; and display, within the session interface, the first media content in the first display state.

According to one or more embodiments of the present disclosure, the first display module is configured to:

if the first media content is picture media content, perform blur processing on at least one picture comprised in the first media content to obtain the first media content in the first display state, wherein the first media content comprises at least one picture; and if the first media content is video media content, perform blur processing on a predetermined image frame of the first media content to obtain the first media content in the first display state.

According to one or more embodiments of the present disclosure, the first display module is configured to:

perform Gaussian blur processing and/or Mosaic processing on the at least one predetermined image comprised in the first media content to obtain the first media content in the first display state.

According to one or more embodiments of the present disclosure, the switching module is configured to:

obtain reply information generated by the first user based on the first media content; and if the reply information satisfies the predetermined first switching condition, switch the display state of the first media content to the predetermined second display state.

According to one or more embodiments of the present disclosure, the switching module is configured to:

in response to a predetermined operation triggered by the first user on the first media content, jump across to a predetermined reply interface; and obtain the reply information based on media content obtained or reply content input by the first user within the reply interface.

According to one or more embodiments of the present disclosure, the reply information comprises second media content generated by the first user based on the first media content; and the switching module is configured to:

in accordance with a determination that the second media content generated by the first user is obtained, switch the display state of the first media content to the predetermined second display state.

According to one or more embodiments of the present disclosure, the number of the first media content is at least one; and the switching module is configured to:

in accordance with a determination that the second media content is obtained, switch the display state of respective first media content to the predetermined second display state;

or, in accordance with a detection that the number of the second media content is the same as the number of the first media content, switch the display state of respective first media content to the predetermined second display state;

or, determine a first number of the generated second media content; and switch the display state of the first number of first media content to the predetermined second display state.

According to one or more embodiments of the present disclosure, the switching module is configured to:

switch, based on the obtained second media content, the display state of a partial region in the first media content to the predetermined second display state.

According to one or more embodiments of the present disclosure, the switching module is configured to:

switch, based on the second media content, the display state of a region in the first media content in the first display state that matches the second media content to the second display state.

According to one or more embodiments of the present disclosure, the first media content is further associated with a predetermined constraint condition; the reply information comprises a second media content; and the switching module is configured to:

detect whether the second media content matches the predetermined constraint condition; and if the second media content matches the predetermined constraint condition, switch the display state of the first media content to the predetermined second display state.

According to one or more embodiments of the present disclosure, the first media content is further associated with predetermined question-answering information, the question-answering information comprising question information and predetermined answering information; the reply information comprises an to-be-verified answering; and the switching module is configured to:

if the to-be-verified answering is the same as the predetermined answering information, switch the display state of the first media content to the predetermined second display state.

According to one or more embodiments of the present disclosure, the switching module is configured to:

detect in real time whether a current time is within a predetermined first time range;

if the current time detected in real time is within the predetermined first time range, switch the display state of the first media content to the predetermined second display state.

According to one or more embodiments of the present disclosure, the switching module is configured to:

determine in real time a received duration corresponding to the first media content; and if the received duration is within a predetermined second time range, in accordance with the satisfaction of the predetermined first switching condition, switch the display state of the first media content to the predetermined second display state.

According to one or more embodiments of the present disclosure, the switching module is further configured to:

if the received duration exceeds the predetermined second time range, switch the display state of the first media content to a predetermined third display state; wherein the third display state is used to characterize that the display state of the first media content is unable to be switched to the predetermined second display state.

According to one or more embodiments of the present disclosure, the switching module is configured to:

in response to a browsing operation by the first user on the first media content, determine browsing information corresponding to the browsing operation, the browsing information comprising a number of browsing times and/or a duration of browsing;

if the browsing information is detected to satisfy a predetermined second switching condition, switch the display state of the first media content to a predetermined third display state; and the third display state is used for characterizing that the display state of the first media content is unable to be switched to the predetermined second display state.

According to one or more embodiments of the present disclosure, the first display module is configured to:

display, within the session interface, at least one predetermined image comprised in the first media content in the first display state, and display first prompt information corresponding to the first display state at a location associated with the first media content in the first display state.

According to one or more embodiments of the present disclosure, the apparatus further comprises:

a jumping module configured to, in response to a trigger operation by the first user on the first media content in the first display state, jump across to a preview interface; and the first display module further configured to display, in the preview interface, the first media content in the first display state and at least one reply content obtaining control.

According to one or more embodiments of the present disclosure, the first display module is configured to:

display, within the session interface, at least one predetermined image comprised in the first media content in the first display state, and display at least one reply content obtaining control at a location associated with the first media content in the first display state.

According to one or more embodiments of the present disclosure, the apparatus further comprises:

the jumping module further configured to, in response to a trigger operation by the first user on a reply information obtaining control, jump across to a media content obtaining interface; and a reply module configured to, in response to a media content obtaining operation triggered by the first user within the media content obtaining interface, obtain the reply information, wherein the reply information comprises a second media content.

According to one or more embodiments of the present disclosure, the reply module is configured to:

perform, based on a trigger operation by the first user on a predetermined collection control within the media content obtaining interface, a collection operation on media content by using a predetermined media content collection component to obtain the second media content;

and/or, perform, based on a trigger operation by the first user on a predetermined uploading control within the media content obtaining interface, an uploading operation on media content by using a predetermined media content uploading component to obtain the second media content.

According to one or more embodiments of the present disclosure, the apparatus further comprises:

the first display module further configured to, in response to a trigger operation by the first user on a reply information obtaining control, displaying a predetermined reply information input field; and the reply module configured to, in response to information input by the first user within the reply information input field, obtaining the reply information.

According to one or more embodiments of the present disclosure, the apparatus further comprises:

the jumping module further configured to, in response to a trigger operation by the first user on the first media content in the second display state, jump across to a preview interface; and the first display module further configured to display, in the preview interface, the first media content in the second display state and second prompt information corresponding to the second display state.

According to one or more embodiments of the present disclosure, the apparatus further comprises:

a switching module configured to, in response to a switching operation triggered by the first user within the preview interface, switch to display reply information generated by the first user.

According to one or more embodiments of the present disclosure, the apparatus further comprises:

a determination module configured to determine the display state corresponding to the first media content; and a first display module configured to display state prompt information associated with the display state within a display region associated with the second user in a predetermined message list interface.

In a fourth aspect, according to one or more embodiments of the present disclosure, an apparatus for displaying a session interface is provided, applied to a client of a second user, comprising:

an obtaining module configured to, in response to a media content obtaining operation triggered by a second user within a predetermined media content obtaining interface, obtain first media content;

a transmitting module configured to determine an association between the first media content and a first switching condition, and transmit the first media content to a first user having a predetermined association with the second user, to enable a display state of the first media content in a session interface of the first user to be adjusted based on a predetermined first switching condition; and a second display module configured to display, within the session interface, at least one predetermined image comprised in the first media content in a predetermined first display state or a predetermined second display state.

According to one or more embodiments of the present disclosure, the second display module is configured to:

display, within the session interface, at least one predetermined image comprised in the first media content in the first display state;

in accordance with a satisfaction of the predetermined first switching condition, switch the display state of the first media content to a predetermined second display state; or displaying, within the session interface, at least one predetermined image comprised in the first media content comprises:

displaying, within the session interface, at least one predetermined image comprised in the first media content in the second display state.

According to one or more embodiments of the present disclosure, the apparatus further comprises:

a interface jumping module configured to, in response to a trigger operation by the second user on the first media content, jump across to a predetermined preview interface; and the second display module configured to display the first media content in the preview interface.

According to one or more embodiments of the present disclosure, the apparatus further comprises:

a information switching module configured to, if a reply message transmitted by the first user is obtained, in response to a switching operation by the second user within the preview interface, switch to display the reply message.

According to one or more embodiments of the present disclosure, the preview interface further comprises a predetermined condition editing control;

the apparatus further comprises:

a condition obtaining module configured to, in response to a trigger operation by the second user on the condition editing control, obtain a predetermined constraint condition input by the second user; and an establishing means configured to establish an association between the first media content and the predetermined constraint condition.

According to one or more embodiments of the present disclosure, the media content obtaining interface comprises a predetermined condition editing control, the transmitting module is configured to:

in response to a trigger operation by the second user on the condition editing control, obtain a predetermined constraint condition input by the second user; and establish the association between the first media content and the predetermined constraint condition as the association between the first media content and the first switching condition.

In a fifth aspect, according to one or more embodiments of the present disclosure, An electronic device is provided, comprising: a processor and memory;

the memory storing computer-executable instructions; and the processor executes the computer-executable instructions stored in the memory, to cause the processor to perform the method of displaying a session interface according to the first aspect and various possible designs of the first aspect or the second aspect and various possible designs of the second aspect.

In a sixth aspect, according to one or more embodiments of the present disclosure, a computer-readable storage medium is provided, wherein the computer-readable storage medium stores computer-executable instructions therein, the computer-executable instructions, when executed by a processor, implementing the method of displaying a session interface according to the first aspect and various possible designs of the first aspect or the second aspect and various possible designs of the second aspect.

In a seventh aspect, according to one or more embodiments of the present disclosure, a computer program product comprising a computer program is provided, wherein the computer program, when executed by a processor, implements the method of displaying a session interface according to the first aspect and various possible designs of the first aspect or the second aspect and various possible designs of the second aspect.

An eighth aspect, according to one or more embodiments of the present disclosure, a computer program is provided, wherein the computer program, when executed by a processor, implements the method of displaying a session interface according to the first aspect and the first aspect of the various possible designs or the second aspect and the second aspect of the various possible designs.

The above description is only a preferred embodiment of the present disclosure and an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept. For example, a technical solution formed by interchanging the above-mentioned features with (but not limited to) technical features having similar functions disclosed in the present disclosure.

Furthermore, although the operations are depicted using a particular order, this should not be construed as requiring that the operations be performed in the particular order shown or in a sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logic actions, it should be understood that the subject matter defined in the appended claims is not necessarily limited to the particular features or actions described above. Rather, the particular features and actions described above are merely an example form of implementing the claims.

We claim:

1. A method of displaying a session interface, applied at a client of a first user, comprising:

receiving, in a session interface for a session between the first user and a second user, a first message corresponding to a first media content sent by the second user, the first message only comprising a first media content in a first display state;

displaying, within a session interface, at least one predetermined image comprised in the first media content in a first display state;

in response to a trigger operation performed by the first user on the first message, switching to a view interface differing from the session interface, the view interface displaying the first media content in the first display state and a media content obtaining control;

obtaining a second media content with the media content obtaining control;

displaying, in the session interface, a second message sent by the first user to switch a display state of the first media content, the second message comprising the second media content in a second display state, the first message and the second message corresponding to different messages in the session; and switching the display state of the first media content comprised in the first message from the first display state to the second display state, wherein switching the display state of the first media content to the second display state comprises:

determining in real time a received duration corresponding to the first media content; and in response to the received duration being within a predetermined second time range, switching the display state of the first media content to the second display state, and wherein after determining in real time a received duration corresponding to the first media content, the method further comprises:

in response to the received duration exceeding the predetermined second time range, switching the display state of the first media content to a third display state, wherein the third display state comprises displaying the first media content with prompt information indicating that the first media content is unable to be switched to the predetermined second display state.

2. The method of claim 1, wherein the first media content is further associated with a predetermined constraint condition; and switching the display state of the first media content to the second display state comprises:

detecting whether the second media content matches the predetermined constraint condition; and in response to the second media content matching the predetermined constraint condition, switching the display state of the first media content to the second display state.

3. The method of claim 1, wherein the first media content is further associated with predetermined question-answering information, the question-answering information comprising question information and predetermined answering information; the second message further comprises the to-be-verified answering; and in response to the second message satisfying the first switching condition, switching the display state of the first media content to the predetermined second display state comprises:

in response to the to-be-verified answering being the same as the predetermined answering information, switching the display state of the first media content to the second display state.

4. The method of claim 1, wherein switching the display state of the first media content to the second display state comprises:

detecting in real time whether a current time is within a predetermined first time range;

in response to the current time detected in real time being within the predetermined first time range, switching the display state of the first media content to the second display state.

5. The method of claim 1, wherein after switching the display state of the first media content to the second display state, the method further comprises:

in response to a browsing operation by the first user on the first media content, determining browsing information corresponding to the browsing operation, the browsing information comprising a number of browsing times and/or a duration of browsing;

in response to the browsing information being detected to satisfy a second switching condition, switching the display state of the first media content to the third display state; and the third display state comprising displaying the first media content with prompt information indicating that the first media content is unable to be switched to the second display state.

6. The method of claim 1, wherein the displaying, within the session interface, at least one predetermined image comprised in the first media content in a first display state comprises:

displaying, within the session interface, at least one predetermined image comprised in the first media content in the first display state, and displaying first prompt information corresponding to the first display state at a location associated with the first media content in the first display state.

7. The method of claim 1, wherein the displaying, within the session interface, at least one predetermined image comprised in the first media content in a first display state comprises:

displaying, within the session interface, at least one predetermined image comprised in the first media content in the first display state, and displaying at least one reply content obtaining control at a location associated with the first media content in the first display state.

8. The method of claim 1, wherein the displaying, within the session interface, at least one predetermined image comprised in the first media content in a first display state comprises:

performing blur processing on the at least one predetermined image comprised in the first media content to obtain the first media content in the first display state; and displaying, within the session interface, the first media content in the first display state.

9. The method of claim 8, wherein the performing blur processing on the at least one predetermined image comprised in the first media content to obtain the first media content in the first display state comprises:

in response to the first media content being picture media content, performing blur processing on at least one picture comprised in the first media content to obtain the first media content in the first display state, wherein the first media content comprises at least one picture; and in response to the first media content being video media content, performing blur processing on a predetermined image frame of the first media content to obtain the first media content in the first display state.

10. The method of claim 8, wherein the performing blur processing on the at least one predetermined image comprised in the first media content to obtain the first media content in the first display state comprises:

performing Gaussian blur processing and/or Mosaic processing on the at least one predetermined image comprised in the first media content to obtain the first media content in the first display state.

11. A non-transitory computer-readable storage medium, wherein the computer-readable storage medium has thereon stored a computer program which, when executed by a computing device, causes the computing device to perform steps comprising:

receiving, in a session interface for a session between a first user and a second user, a first message corresponding to a first media content sent by the second user, the first message only comprising a first media content in a first display state;

displaying, within a session interface, at least one predetermined image comprised in the first media content in a first display state;

in response to a trigger operation performed by the first user on the first message, switching to a view interface differing from the session interface, the view interface displaying the first media content in the first display state and a media content obtaining control;

obtaining a second media content with the media content obtaining control;

displaying, in the session interface, a second message sent by the first user to switch a display state of the first media content, the second message comprising the second media content in a second display state, the first message and the second message corresponding to different messages in the session; and switching the display state of the first media content comprised in the first message from the first display state to the second display state, wherein switching the display state of the first media content to the second display state comprises:

determining in real time a received duration corresponding to the first media content; and in response to the received duration being within a predetermined second time range, switching the display state of the first media content to the second display state, and wherein after determining in real time a received duration corresponding to the first media content, the method further comprises:

in response to the received duration exceeding the predetermined second time range, switching the display state of the first media content to a third display state, wherein the third display state comprises displaying the first media content with prompt information indicating that the first media content is unable to be switched to the predetermined second display state.

12. The non-transitory computer-readable storage medium according to claim 11, wherein the first media content is further associated with a predetermined constraint condition; and the computing device is further caused to perform:

switching the display state of the first media content to the second display state comprises:

detecting whether the second media content matches the predetermined constraint condition; and in response to the second media content matching the predetermined constraint condition, switching the display state of the first media content to the second display state.

13. The non-transitory computer-readable storage medium according to claim 11, wherein the first media content is further associated with predetermined question-answering information, the question-answering information comprising question information and predetermined answering information; the second message further comprises the to-be-verified answering; and in response to the second message satisfying the first switching condition, switching the display state of the first media content to the predetermined second display state comprises:

in response to the to-be-verified answering being the same as the predetermined answering information, switching the display state of the first media content to the second display state.

14. The non-transitory computer-readable storage medium according to claim 11, wherein switching the display state of the first media content to the second display state comprises:

detecting in real time whether a current time is within a predetermined first time range;

in response to the current time detected in real time being within the predetermined first time range, switching the display state of the first media content to the second display state.

15. The non-transitory computer-readable storage medium according to claim 11, wherein after switching the display state of the first media content to the second display state, the computing device is further caused to perform:

in response to a browsing operation by the first user on the first media content, determining browsing information corresponding to the browsing operation, the browsing information comprising a number of browsing times and/or a duration of browsing;

in response to the browsing information being detected to satisfy a second switching condition, switching the display state of the first media content to the third display state; and the third display state comprising displaying the first media content with prompt information indicating that the first media content is unable to be switched to the second display state.

16. The non-transitory computer-readable storage medium according to claim 11, wherein the displaying, within the session interface, at least one predetermined image comprised in the first media content in a first display state comprises:

displaying, within the session interface, at least one predetermined image comprised in the first media content in the first display state, and displaying first prompt information corresponding to the first display state at a location associated with the first media content in the first display state.

17. The non-transitory computer-readable storage medium according to claim 11, wherein the displaying, within the session interface, at least one predetermined image comprised in the first media content in a first display state comprises:

performing blur processing on the at least one predetermined image comprised in the first media content to obtain the first media content in the first display state; and displaying, within the session interface, the first media content in the first display state.

18. The non-transitory computer-readable storage medium according to claim 17, wherein the performing blur processing on the at least one predetermined image comprised in the first media content to obtain the first media content in the first display state comprises:

in response to the first media content being picture media content, performing blur processing on at least one picture comprised in the first media content to obtain the first media content in the first display state, wherein the first media content comprises at least one picture; and in response to the first media content being video media content, performing blur processing on a predetermined image frame of the first media content to obtain the first media content in the first display state.

19. The non-transitory computer-readable storage medium according to claim 17, wherein the performing blur processing on the at least one predetermined image comprised in the first media content to obtain the first media content in the first display state comprises:

performing Gaussian blur processing and/or Mosaic processing on the at least one predetermined image comprised in the first media content to obtain the first media content in the first display state.

20. An electronic device comprising: a processor and memory;

the memory storing computer-executable instructions; and the processor executes the computer-executable instructions stored in the memory, to cause the processor to perform a method of displaying a session interface comprising:

receiving, in a session interface for a session between a first user and a second user, a first message corresponding to a first media content sent by the second user, the first message only comprising a first media content;

displaying, within a session interface, at least one predetermined image comprised in the first media content in a first display state;

in response to a trigger operation performed by the first user on the first message, switching to a view interface differing from the session interface, the view interface displaying the first media content in the first display state and a media content obtaining control;

obtaining a second media content with the media content obtaining control;

displaying, in the session interface, a second message sent by the first user to switch a display state of the first media content, the second message comprising the second media content in a second display state, the first message and the second message corresponding to different messages in the session; and switching the display state of the first media content comprised in the first message from the first display state to the second display state, wherein switching the display state of the first media content to the second display state comprises:

determining in real time a received duration corresponding to the first media content; and in response to the received duration being within a predetermined second time range, switching the display state of the first media content to the second display state, and wherein after determining in real time a received duration corresponding to the first media content, the method further comprises:

in response to the received duration exceeding the predetermined second time range, switching the display state of the first media content to a third display state, wherein the third display state comprises displaying the first media content with prompt information indicating that the first media content is unable to be switched to the predetermined second display state.

* * * * *